US011245875B2

(12) United States Patent
Ortiz Egea et al.

(10) Patent No.: US 11,245,875 B2
(45) Date of Patent: Feb. 8, 2022

(54) MONITORING ACTIVITY WITH DEPTH AND MULTI-SPECTRAL CAMERA

(71) Applicant: Microsoft Technology Licensing, LLC, Redmond, WA (US)

(72) Inventors: Sergio Ortiz Egea, San Jose, CA (US); Riaz Imdad Ali, Fremont, CA (US); Michael Scott Fenton, Sunnyvale, CA (US); Onur Can Akkaya, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 16/248,409

(22) Filed: Jan. 15, 2019

(65) Prior Publication Data
US 2020/0228753 A1     Jul. 16, 2020

(51) Int. Cl.
*H04N 7/18*     (2006.01)
*G06K 9/00*     (2006.01)
(Continued)

(52) U.S. Cl.
CPC ......... *H04N 7/181* (2013.01); *G06K 9/00362* (2013.01); *H04N 5/247* (2013.01); *H04N 5/33* (2013.01)

(58) Field of Classification Search
CPC .......... H04N 7/181; H04N 5/33; H04N 5/247; G06K 9/00362
See application file for complete search history.

(56) References Cited

U.S. PATENT DOCUMENTS 3,951,221 A * 4/1976 Rock .................. B07C 1/00
    177/1
5,838,428 A    11/1998 Pipitone et al.
(Continued)

FOREIGN PATENT DOCUMENTS

CN     106570903 A    4/2017
CN     106935048 A    7/2017
(Continued)

OTHER PUBLICATIONS

Kruegle, Herman, "CCTV Surveillance: Video Practices and Technology", In Book of CCTV Surveillance : Analog and Digital Video Practices and Technology, Second Edition, Jan. 2007, p. 132.
(Continued)

*Primary Examiner* — Shawn S An
(74) *Attorney, Agent, or Firm* — Alleman Hall Creasman & Tuttle LLP

(57) ABSTRACT

A camera system is configured to automatically monitor an area. Depth image(s) of the area are acquired based on active IR light emitted by the camera system and reflected from the area to a sensor array of the camera system. The depth image(s) are computer analyzed to identify a human subject. For each spectral illuminator of the camera system, spectral light image(s) of the area are acquired based on active spectral light in the spectral light sub-band of the spectral illuminator reflected from the area to the sensor array. The spectral light image(s) for the spectral illuminators are computer analyzed to identify an interaction between the human subject and an object in the area. In response to identifying the interaction between the human subject and the object in the area, an action to be performed for the object in the area is computer issued.

20 Claims, 11 Drawing Sheets

US 11,245,875 B2
Page 2

(51) Int. Cl.
*H04N 5/247* (2006.01)
*H04N 5/33* (2006.01)

(56) References Cited

U.S. PATENT DOCUMENTS

| | | | |
|---|---|---|---|
| 6,040,916 | A | 3/2000 | Griesinger |
| 6,360,612 | B1* | 3/2002 | Trantzas ............ G01L 1/20 73/753 |
| 6,456,793 | B1 | 9/2002 | Ray et al. |
| 6,633,354 | B2 | 10/2003 | Li et al. |
| 6,639,594 | B2 | 10/2003 | Zhang et al. |
| 6,876,392 | B1 | 4/2005 | Uomori et al. |
| 6,906,793 | B2 | 6/2005 | Bamji et al. |
| 7,026,600 | B2 | 4/2006 | Jamieson et al. |
| 7,157,685 | B2 | 1/2007 | Bamji et al. |
| 7,187,452 | B2 | 3/2007 | Jupp et al. |
| 7,227,977 | B1 | 6/2007 | Dotsenko |
| 7,265,846 | B2 | 9/2007 | Forsyth |
| 7,310,125 | B2 | 12/2007 | Kim et al. |
| 7,342,658 | B2 | 3/2008 | Kowarz et al. |
| 7,375,803 | B1 | 5/2008 | Bamji |
| 7,417,727 | B2 | 8/2008 | Polonskiy et al. |
| 7,420,656 | B1 | 9/2008 | Sandusky et al. |
| 7,460,160 | B2 | 12/2008 | Hershey et al. |
| 7,612,356 | B2 | 11/2009 | Utida et al. |
| 7,652,736 | B2 | 1/2010 | Padiyath et al. |
| 7,835,002 | B2 | 11/2010 | Muhammed et al. |
| 7,835,554 | B2 | 11/2010 | Rowe |
| 8,049,163 | B1 | 11/2011 | Granneman et al. |
| 8,090,160 | B2 | 1/2012 | Kakadiaris et al. |
| 8,130,292 | B2 | 3/2012 | Lee |
| 8,194,149 | B2 | 6/2012 | Thomas et al. |
| 8,300,234 | B2 | 10/2012 | Debevec et al. |
| 8,442,355 | B2 | 5/2013 | Imai |
| 8,681,216 | B2 | 3/2014 | Atkinson |
| 8,780,113 | B1 | 7/2014 | Ciurea et al. |
| 9,007,457 | B2 | 4/2015 | Levesque |
| 9,053,571 | B2 | 6/2015 | Shotton et al. |
| 9,060,110 | B2 | 6/2015 | Imai |
| 9,129,277 | B2 | 9/2015 | MacIntosh |
| 9,269,022 | B2 | 2/2016 | Rhoads et al. |
| 9,304,081 | B2 | 4/2016 | Renno |
| 9,316,540 | B1* | 4/2016 | Phua ............ G01J 3/0272 |
| 9,316,865 | B2 | 4/2016 | Osterman et al. |
| 9,551,616 | B2 | 1/2017 | McQuilkin et al. |
| 9,595,239 | B2 | 3/2017 | Drolet et al. |
| 9,602,807 | B2 | 3/2017 | Crane et al. |
| 9,625,569 | B2 | 4/2017 | Lange |
| 9,720,511 | B2 | 8/2017 | Melle et al. |
| 9,818,195 | B2 | 11/2017 | Zach |
| 9,958,383 | B2 | 5/2018 | Hall et al. |
| 2003/0137646 | A1 | 7/2003 | Hoffman et al. |
| 2004/0070565 | A1 | 4/2004 | Nayar et al. |
| 2004/0201586 | A1 | 10/2004 | Marschner et al. |
| 2004/0263510 | A1 | 12/2004 | Marschner et al. |
| 2007/0055427 | A1* | 3/2007 | Sun ............ G06K 9/00362 701/45 |
| 2010/0026850 | A1 | 2/2010 | Katz |
| 2010/0053592 | A1 | 3/2010 | Yahav et al. |
| 2010/0111370 | A1 | 5/2010 | Black et al. |
| 2010/0140461 | A1 | 6/2010 | Sprigle et al. |
| 2010/0183205 | A1 | 7/2010 | Pfleger et al. |
| 2010/0202683 | A1* | 8/2010 | Robinson ............ H04N 5/33 382/164 |
| 2010/0245634 | A1* | 9/2010 | Ahdoot ............ H04N 5/33 348/250 |
| 2011/0044506 | A1 | 2/2011 | Chen |
| 2011/0102566 | A1 | 5/2011 | Zakian et al. |
| 2011/0149041 | A1 | 6/2011 | Eccles et al. |
| 2011/0176709 | A1 | 7/2011 | Park et al. |
| 2011/0211066 | A1 | 9/2011 | Fujiki |
| 2012/0098935 | A1 | 4/2012 | Schmidt et al. |
| 2012/0098976 | A1 | 4/2012 | Matsushita et al. |
| 2012/0206452 | A1 | 8/2012 | Geisner et al. |
| 2012/0287247 | A1 | 11/2012 | Stenger et al. |
| 2013/0100250 | A1 | 4/2013 | Raskar et al. |
| 2013/0163879 | A1 | 6/2013 | Katz et al. |
| 2013/0257748 | A1 | 10/2013 | Ambrus et al. |
| 2013/0329052 | A1* | 12/2013 | Chew ............ G06K 9/00771 348/159 |
| 2014/0002610 | A1 | 1/2014 | Xi et al. |
| 2014/0085625 | A1 | 3/2014 | Ahmed et al. |
| 2014/0098018 | A1 | 4/2014 | Kim et al. |
| 2014/0112574 | A1 | 4/2014 | Kim et al. |
| 2014/0118501 | A1 | 5/2014 | Kim et al. |
| 2014/0313376 | A1 | 10/2014 | Van nieuwenhove et al. |
| 2014/0346361 | A1* | 11/2014 | Wang ............ G01S 17/04 250/349 |
| 2014/0378843 | A1 | 12/2014 | Valdes et al. |
| 2015/0002419 | A1 | 1/2015 | White et al. |
| 2015/0098616 | A1 | 4/2015 | Gervautz et al. |
| 2015/0109414 | A1 | 4/2015 | Adam et al. |
| 2015/0123967 | A1 | 5/2015 | Quinn et al. |
| 2015/0184997 | A1* | 7/2015 | Campbell ............ G01S 17/46 250/349 |
| 2015/0304637 | A1 | 10/2015 | Shin et al. |
| 2016/0006914 | A1 | 1/2016 | Neumann |
| 2016/0033806 | A1 | 2/2016 | Lavrentovich et al. |
| 2016/0103015 | A1 | 4/2016 | Ichihashi |
| 2016/0178512 | A1 | 6/2016 | Hall et al. |
| 2017/0085790 | A1* | 3/2017 | Bohn ............ H04N 5/247 |
| 2017/0140221 | A1 | 5/2017 | Ollila et al. |
| 2017/0230551 | A1 | 8/2017 | Akkaya et al. |
| 2017/0272651 | A1 | 9/2017 | Mathy et al. |
| 2018/0046874 | A1 | 2/2018 | Guo et al. |
| 2018/0074329 | A1* | 3/2018 | Kazansky ............ G06F 3/04815 |
| 2018/0106936 | A1* | 4/2018 | Heshmat Dehkordi ............ G02B 27/144 |
| 2018/0197274 | A1 | 7/2018 | Price et al. |
| 2018/0197275 | A1 | 7/2018 | Price et al. |
| 2018/0204329 | A1 | 7/2018 | Cutu et al. |
| 2018/0373928 | A1* | 12/2018 | Glaser ............ G06K 9/00369 |
| 2019/0286892 | A1* | 9/2019 | Li ............ G06K 9/00362 |
| 2019/0306386 | A1* | 10/2019 | Akkaya ............ G02B 5/3025 |
| 2019/0349536 | A1* | 11/2019 | Ortiz Egea ............ H04N 5/2254 |

FOREIGN PATENT DOCUMENTS

| | | |
|---|---|---|
| EP | 1058147 A2 | 12/2000 |
| GB | 2458927 A | 10/2009 |
| JP | H05346365 A | 12/1993 |
| JP | 2003156430 A | 5/2003 |
| WO | 2012057558 A2 | 5/2012 |
| WO | 2015077493 A1 | 5/2015 |
| WO | 2017090034 A1 | 6/2017 |
| WO | 2017149370 A1 | 9/2017 |
| WO | 2017177284 A1 | 10/2017 |
| WO | 2018047705 A1 | 3/2018 |

OTHER PUBLICATIONS

"International Search Report and Written Opinion Issued in PCT Application No. PCT/US2019/068915", dated Mar. 27, 2020, 19 Pages.

Sporrer, et al., "NIR Camera Based Person Detection in the Working Range of Industrial Robots", In Proceedings of International Conference on Safety of Industrial Automated Systems, Nov. 18, 2015, 06 Pages.

"Computer Vision Group", Retrieved From https://web.archive.org/web/20120618073421/https://vision.in.turn.de/data/datasets/rgbd-dataset/file_formats, Jun. 18, 2012, 4 Pages.

"Depth Biomechanics", Retrieved from http://www.depthbiomechanics.co.uk/?p=2659, Jan. 27, 2014, 5 Pages.

"Multispectral Optical Filter Assemblies", Retrieved From https://web.archive.org/web/20130912193244/https:/www.photonicsonline.com/doc/multispectral-optical-filter-assemblies-0001, Sep. 12, 2013, 1 Page.

"openni_launch/Tutorials/Extrinsic Calibration", Retrieved from http://wiki.ros.org/openni_launch/Tutorials/ExtrinsicCalibration, Mar. 4, 2013, 4 Pages.

(56) References Cited

OTHER PUBLICATIONS

"Non-final Office Action Issued in U.S. Appl. No. 13/627,809", dated Oct. 31, 2014, 15 Pages.
"Final Office Action Issued in U.S. Appl. No. 14/574,451", dated Sep. 15, 2017, 11 Pages.
"Non-final Office Action Issued in U.S. Appl. No. 14/574,451", dated Feb. 8, 2017, 11 Pages.
"Notice of Allowance Issued in U.S. Appl. No. 14/574,451", dated Dec. 26, 2017, 8 Pages.
"Non Provisional Application as Filed in U.S. Appl. No. 15/991,981", filed May 29, 2018, 48 Pages.
"Notice of Allowance Issued in U.S. Appl. No. 16/004,072", dated Jun. 17, 2019, 10 Pages.
Abdo, et al., "3D Camera Calibration", Retrieved from http://citeseerx.ist.psu.edu/viewdoc/download?doi=10.1 1.302.8355&rep=rep1&type=pdf, Oct. 6, 2014, 06 Pages.
Staranowicz, et al., "Easy-to-Use and Accurate Calibration of RGB-D Cameras from Spheres", In Proceedings of Image and Video Technology—6th Pacific-Rim Symposium, Oct. 28, 2013, 14 Pages.
Bamji, et al., "A 0.13 um CMOS System-on-Chip for a 512×424 Time-of-Flight Image Sensor With Multi-Frequency Photo-Demodulation up to 130 MHz and 2 GS/s ADC", In IEEE Journal of Solid-State Circuits, vol. 50, Issue 1, Jan. 2015, 17 Pages.
Bourlai, et al., "Multi-Spectral Face Recognition: Identification of People in Difficult Environments", In Proceedings of IEEE International Conference on Intelligence and Security Informatics, Jun. 11, 2012, pp. 196-201.
Conroy, et al., "A Power-Saving Modulation Technique for Time-of-Flight Range Imaging Sensors", n Proceedings of SPIE Optical Metrology, Jun. 21, 2011, 13 Pages.
Crabb, et al., "Fast single-frequency time-of-flight range imaging", In Proceedings of IEEE Conference on Computer Vision and Pattern Recognition Workshops, Jun. 7, 2015, pp. 58-65.
Droeschel, et al., "Multi-frequency Phase Unwrapping for Time-of-Flight cameras", In Proceedings of the IEEE/RSJ International Conference on Intelligent Robots and Systems (IROS), Oct. 18, 2010, pp. 1463-1469.
Dunne, et al., "Efficient Generic Calibration Method for General Cameras with Single Centre of Projection", In 11th International Conference on Computer Vision, Oct. 14, 2007, 8 Pages.
Ellmauthaler, "A Novel Iterative Calibration Approach for Thermal Infrared Cameras", In 20th International Conference on Image Processing, Sep. 15, 2013, pp. 2182-2186.
Fuchs, et al., "Extrinsic and Depth Calibration of ToF-Cameras", In Proceedings of the IEEE Conference on Computer Vision and Pattern Recognition, Jun. 23, 2008, 6 Pages.
Hans, et al., "Techniques and Applications of Hyperspectral Image Analysis", Published in John Wiley & Sons, Sep. 27, 2007.
Hansard, et al., "Time-of-Flight Cameras: Principles, Methods and Applications", Published in Springer Briefs in Computer Science, Dec. 7, 2012, 103 Pages.
Herrera, et al., "Joint Depth and Color Camera Calibration with Distortion Correction", In Transactions on Pattern Analysis and Machine Intelligence, vol. 34, Issue 10, Oct. 2012, pp. 2058-2064.
Kim, et al., "3D Multi-Spectrum Sensor System with Face Recognition", In Journal of Sensors, vol. 13, Issue 10, Oct. 2013, pp. 12804-12829.

Kim, et al., "A 1 5Mpixel RGBZ CMOS Image Sensor for Simultaneous Color and Range Image Capture", In Proceedings of IEEE International Solid-State Circuits Conference Digest of Technical Papers, Feb. 19, 2012, pp. 391-393.
Kirmani, et al., "SPUMIC: Simultaneous Phase Unwrapping and Multipath Interference Cancellation in Time-of-Flight Cameras Using Spectral Methods", In Proceedings of IEEE International Conference on Multimedia and Expo, Jul. 15, 2013, 6 Pages.
Kumar, et al., "Low Power Time-of-Flight 3D Imager System in Standard CMOS", In Proceedings of 19th IEEE International Conference on Electronics, Circuits and Systems, Dec. 9, 2012, pp. 941-944.
Lai, et al., "Multi-Spectral Facial Biometrics in Access Control", In Proceedings of IEEE Symposium on Computational Intelligence in Biometrics and Identity Management, Dec. 9, 2014, 8 Pages.
Li, Larry, "Time-of-Flight Camera—An Introduction", In Technical White Paper, Jan. 2014, 10 Pages.
Lowe, David G., "Object Recognition from Local Scale-Invariant Features", In Proceedings of 7th IEEE International Conference on Computer Vision, Sep. 20, 1999, 8 Pages.
Mathies, Daven, "Panasonic's new organic sensor can switch between visible and NIR sensitivity", Retrieved from https://www.digitaltrends.com/photography/panasonic-organic-visible-nir-sensor/, Feb. 10, 2017, 6 Pages.
McIlroy, et al., "Kinectrack: Agile 6-DoF Tracking Using a Projected Dot Pattern", In International Symposium on Mixed and Augmented Reality, Nov. 5, 2012, 7 Pages.
Mikolajczyk, Krystian, et al., "A Performance Evaluation of Local Descriptors", In Journal of IEEE Transactions on Pattern Analysis and Machine Intelligence, vol. 27, Issue 10,, Oct. 2005, pp. 1615-1630.
Naik, et al., "Single View Reflectance Capture using Multiplexed Scattering and Time-of-flight Imaging", In Proceedings of Asia Conference, vol. 30, Issue 6, Dec. 15, 2011, 10 Pages.
Park, et al., "Real Time Rectification Using Differentially Encoded Lookup Table", In Proceedings of the 5th International Conference on Ubiquitous Information Management and Communication, Feb. 21, 2011, 4 Pages.
Xiang, et al., "Electrically Tunable Selective Reflection of Light from Ultraviolet to Visible and Infrared by Heliconical Cholesterics", In Journal of Advanced Materials, vol. 27, Issue 19, Mar. 27, 2015, pp. 3014-3018.
"International Search Report and Written opinion issued in PCT Application No. PCT/US2015/063568", dated Mar. 3, 2016, 11 Pages.
"Second Written Opinion Issued in PCT Application No. PCT/US2015/063568", dated Aug. 5, 2016, 4 Pages.
Puestow, et al., "Oil Spill Detection and Mapping in Low Visibility and Ice: Surface Remote Sensing", Retrieved from: http://www.arcticresponsetechnology.org/wp-content/uploads/2017/09/Report-5.1-SURFACE-REMOTE-SENSING.pdf, Oct. 15, 2013, 84 Pages.
Raposo,, et al., "Fast and Accurate Calibration of a Kinect Sensor", In Proceedings of International Conference on 3DV-Conference, Jun. 29, 2013, 8 Pages.
Shotton, et al., "TextonBoost: Joint Appearance, Shape and Context Modeling for Mulit-Class Object Recognition and Segmentation", In Proceedings of European Conference on Computer Vision, May 7, 2006, pp. 1-14.

\* cited by examiner

MONITORING ACTIVITY WITH DEPTH AND MULTI-SPECTRAL CAMERA

BACKGROUND

There are many environments in which humans interact with various objects. For example, in retail shopping areas, human shoppers may take objects for purchase from the shelves to the cash registers while human workers may restock shelves, rearrange products, and help shoppers complete purchases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A camera system is configured to automatically monitor an area. Depth image(s) of the area are acquired based on active IR light emitted by the camera system and reflected from the area to a sensor array of the camera system. The depth image(s) are computer analyzed to identify a human subject. For each spectral illuminator of the camera system, spectral light image(s) of the area are acquired based on active spectral light in the spectral light sub-band of the spectral illuminator reflected from the area to the sensor array. The spectral light image(s) for the spectral illuminators are computer analyzed to identify an interaction between the human subject and an object in the area. The spectral information also may be used to support identification of the human subject and the object. In response to identifying the interaction between the human subject and the object in the area, an action to be performed for the object is computer issued.

DETAILED DESCRIPTION

In some examples, greyscale or color (e.g., RBG) cameras may be deployed to monitor an area where humans interact with objects, such as a retail shopping area. For example, images from security cameras, which may already be deployed in a retail shopping area, may be computer analyzed to detect actions performed by a shopper. An example of an action that may be detected includes picking up an object for purchase from a shelf and placing the object in a shopping cart or basket. However, security cameras often have high field of view optics, with low resolution that makes it difficult to computer recognize shopper actions and/or objects picked up by a shopper. Moreover, the computer vision processing operations required to be performed on greyscale and/or color images in order to computer recognize such shopper actions may negatively affect overall power consumption, memory usage, processor utilization, and/or other aspects of a computing system.

Accordingly, the present description is directed to methods and systems for automatically computer monitoring an area (e.g., retail shopping area) with one or more ambient invariant depth+multi-spectral cameras. By deploying such cameras to automatically computer monitor an area, interaction between human subjects (e.g., shoppers, retail employees) and objects (e.g., objects for purchase in the retail shopping area) can be accurately computer recognized such that various actions (e.g., retail actions) may be performed. While different environments will be suitable for different types of automated actions, in retail environment various automated retail actions may be performed. Example retail actions may include associating an object for purchase with a particular shopper, issuing a notification to restock an object in a retail area, and issuing a notification to check an object for quality control purposes. Moreover, in some implementations, such cameras may be controlled in a manner that reduces power consumption while still enabling continuous automatic computer monitoring. While a retail shopping area is used as an example, it is to be understood that other areas where humans interact with objects may be monitored in this manner, and other, non-retail, actions related to the humans, objects, and/or areas may be performed.

Figure 1:
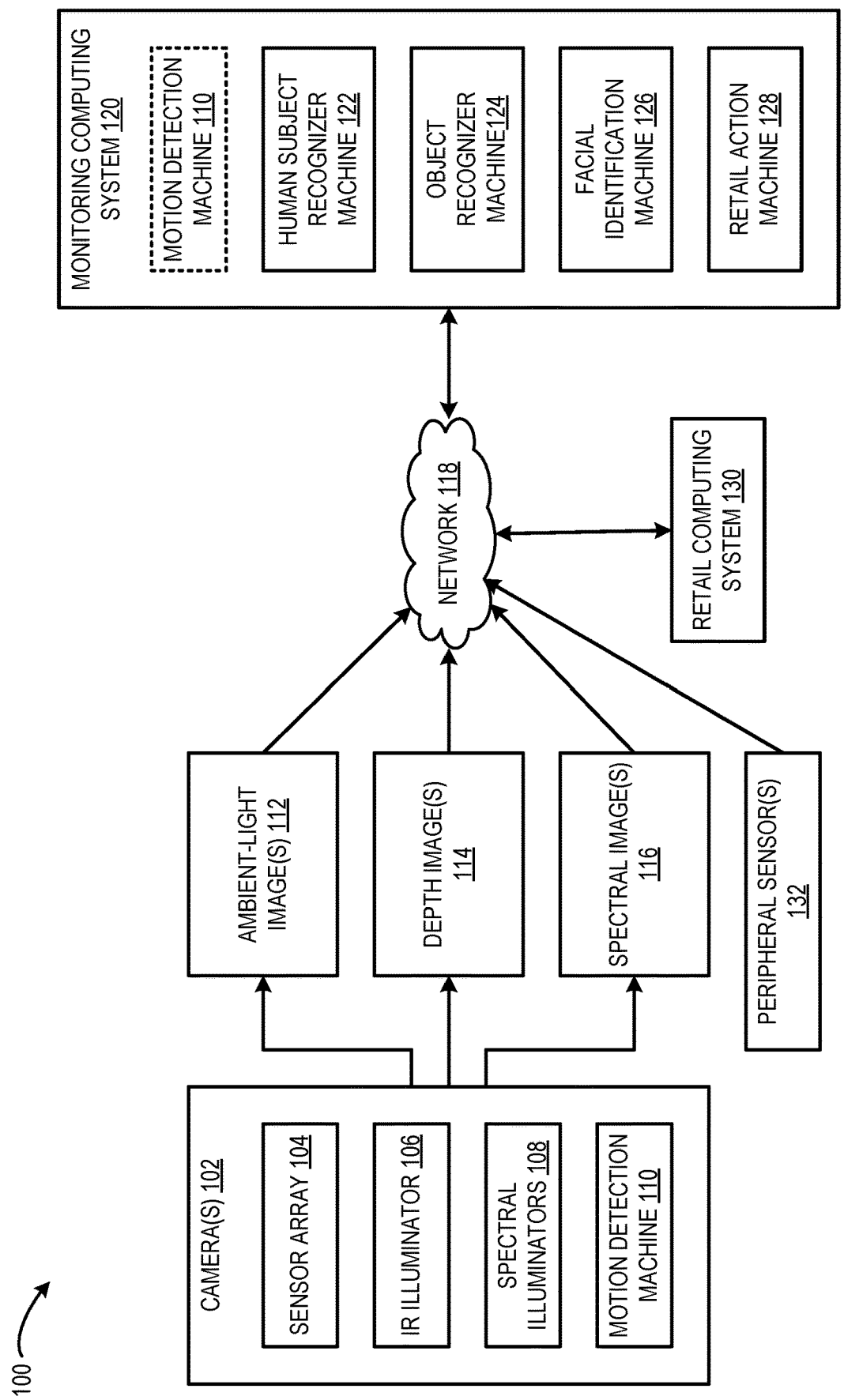
FIG. 1 schematically shows a camera system configured for automatic computer monitoring of an area.

FIG. 1 schematically shows a camera system 100 configured to automatically monitor a retail shopping area in order to identify interactions between human subjects and objects for purchase in the retail shopping area. The camera system 100 comprises one or more cameras 102. In one example, the camera(s) 102 may be ambient invariant depth+multi-spectral cameras. Each camera 102 includes a sensor array 104, an infrared (IR) illuminator 106, and a plurality of spectral illuminators 108. The IR illuminator 106 may be configured to emit active IR light in an IR light sub-band. Each spectral illuminator 108 may be configured to emit active spectral light in a different spectral light sub-band. Each camera 102 may be configured to address the sensor array 104 without active illumination from the IR illuminator 106 and without active illumination from the plurality of spectral illuminators 108 to acquire one or more ambient-light images 112 of a retail shopping area. Further, each camera 102 may be configured to activate the IR illuminator 106 and address the sensor array 104 to acquire one or more depth images 114 of the retail shopping area based on active IR light reflected from the retail shopping area. Further still, each camera 102 may be configured to activate a spectral illuminator 108 and address the sensor array 104 to acquire one or more spectral light images 116 in the spectral light sub-band of the spectral illuminator. The camera 102 may be configured to acquire one or more spectral light images 116 for each of the plurality of spectral light sub-bands of the plurality of spectral illuminators 108.

Each camera 102 may be configured to operate in different modes in which the different types of images may be acquired. Under some conditions, the camera(s) 102 may be configured to operate in a low-power mode in which the ambient-light images 112 may be acquired without acquiring either depth images or spectral light images. This mode of operation may be considered a low-power mode because the IR illuminator 106 and the spectral illuminators 108 are not activated to acquire the ambient-light images 112. Further, in some examples, a frame rate for acquiring the ambient-light images may be lower than a frame rate for acquiring the other types of images (e.g. depth and spectral).

The camera system 100 may be configured to computer analyze the ambient-light images 112 to identify an above-threshold motion. For example, a camera 102 may operate in the low power mode when below-threshold motion or no motion is detected in a field of view of the camera. In some implementations, each camera 102 may include an on-board motion detection machine 110 configured to detect the above-threshold motion in the ambient-light images 112. For example, the motion detection machine 110 may be configured to perform a comparison of different ambient-light images acquired at different times (e.g., a sequence of ambient-light images) to identify an above-threshold motion. In some implementations, the threshold for identifying motion may correspond to a number of pixels changing from frame to frame. For example, above threshold motion may be triggered if contiguous pixels occupying at least 3% of a field of view change by more than 5% from frame to frame. However, this is just an example, and other parameters/threshold may be used. In some examples, above-threshold motion may correspond to a human subject entering or moving in a field of view of the camera 112.

In some implementations, the camera(s) 102 may be communicatively coupled via a computer network 118 with a monitoring computer system 120. In some examples, the monitoring computer system 120 may comprise a network server, edge computing device, internet-of-things (IoT) device, a desktop, laptop or tablet computer, mobile computing device, mobile communication device (e.g., smart phone), and/or other computing device that may or may not be physically integrated with other components described herein. Additional details regarding the components and computing aspects are described in more detail below with reference to FIG. 8. In some examples, the monitoring computing system 120 may be located remotely from the camera(s) 102 and may host a variety of remote services that may be used to identify interactions between human subjects and objects for purchase in the retail shopping area as described herein. In other examples, the monitoring computing system 120 may be located on the same premises as the camera(s) 102. In yet other examples, aspects of the monitoring computing system 120 may be integrated into the camera(s) 102. In different examples, various combinations of the camera(s) 102 and aspects of the monitoring computing system 120 may be enclosed in a common housing.

In some such implementations, the motion detection machine 110 may be executed by the monitoring computer system 120. In particular, the camera(s) 102 may send the ambient-light images 112 to the monitoring computer system 120 via the computer network 118. The motion detection machine 110 may computer analyze the ambient-light images to determine whether an ambient-light image includes above-threshold motion. Further, the monitoring computing system 120 may send, to the camera 102 via the computer network 118, an indication of whether an ambient-light image includes above-threshold motion.

In response to identifying above-threshold motion in an ambient-light image, a camera 102 may switch from the low-power mode of operation to a high-power mode of operation. In the higher power mode, a camera 102 may acquire depth images. In particular, the camera 102 may be configured to activate the IR illuminator 106 to illuminate at least a portion of the retail shopping area with the active IR light, and address the the sensor array 104 to acquire depth images 114. Further, the camera 102 may send the depth images to the monitoring computing system 120 via the computer network 118.

The monitoring computing system 120 may include a human subject recognizer machine 122 configured to computer analyze the one or more depth images to identify a human subject. The human subject recognizer machine may utilize, for example, a previously trained artificial neural network to recognize the presence of a human within a depth image. Further, the monitoring computing system 120 may send, to the camera 102 via the computer network 118, an indication of whether a depth image includes a human subject.

The camera 102 may acquire depth images until a human subject is identified or until the camera returns to operation in low-power mode if a human is not identified within a search duration after above-threshold motion is detected. For example, the camera 102 may return to operation in low-power mode based on no above-threshold motion being identified for a threshold number of frames or another suitable duration.

In response to identifying the human subject in a depth image, the camera 102 may begin spectral light image acquisition. In particular, the camera 102 may acquire one or more spectral light images 116 in each of a plurality of different spectral light sub-bands corresponding to the plurality of spectral illuminators 108. In particular, the camera 102 may be configured to, for each spectral illuminator, activate the spectral illuminator 108 to illuminate a portion of the retail shopping area with active spectral light in the spectral light sub-band of the spectral illuminator 108, and address the sensor array 104 to acquire one or more spectral light images of the portion of the retail shopping area based on the active spectral light reflected from the portion of the retail shopping area. The camera 102 may be configured to send the spectral light images 116 to the monitoring computer system 120 via the computer network 118.

The monitoring computer system 120 may include an object recognizer machine 124 configured to computer analyze the spectral light images 116, depth images 114, and/or ambient light images 112 in order to identify an interaction between the recognized human subject and an object for purchase in the retail shopping area. In some examples, the object recognizer machine 124 may be configured to measure a spectral signature of an object based on the one or more spectral light images and the one or more depth images, and identify the object based on the measured spectral signature. In some examples, the object recognizer machine 124 may computer analyze regions of interest of the spectral light images 116, such as regions proximate to a human subject's hands. In some examples, the object recognizer machine 124 may computer analyze larger regions up to and including an entire spectral light image. The object recognizer machine 124 may be configured to recognize any suitable type of specified object in the spectral light images 116. In some implementations, the object recognizer machine 124 may be configured to recognize a plurality of different types of objects. For example, the object recognizer machine 124 may be configured to recognize boxes, cans, bottles, jars, fruits, vegetables, meats, furniture, appliances, sporting goods, toys, human subjects or any other suitable specified object. Moreover, the object recognizer machine 124 may be configured to recognize any suitable part or feature of a specified object. In some implementations, the object recognizer machine may utilize, for example, a previously trained artificial neural network trained to accept one or more ambient light, depth, and/or spectral images as inputs.

In some implementations, the information produced by the object recognizer machine 124 may be used to detect the status of goods and perform associated actions. For example, recognizing goods on a shelf would allow for knowing the amount of goods remaining on the shelf. Further, re-stocking thresholds may be set for the amount of goods on the shelf that would allow for optimizing the supply management of such goods. Also, in some examples, the object recognizer machine 124 may be configured to track/detect the freshness of goods (e.g., fruits), and the monitoring computer system 120 may issue a retail action to replace goods when they expire based on detection by the object recognizer machine 124.

In some implementations, the object recognizer machine 124 may be configured to computer analyze the spectral light images 116 and/or other images to determine a volume of a recognized object for purchase. The determined volume may be used to derive a weight of the recognized object for purchase based on a predetermined density of the object. By determining the weight of an object for purchase, the total cost of loose bulk objects that are priced according to weight may be calculated for a shopper as part of a retail action issued by the monitoring computer system 120.

The monitoring computer system 120 may include a facial identification machine 126 configured to computer analyze the spectral light images 116 and/or other images in order to identify an identity of a human subject that is identified as interacting with a recognized object for purchase in the retail shopping area. In some examples, the facial identification machine 126 may be configured to measure a spectral signature of the human subject's face based on the one or more spectral light images and the one or more depth images; and computer identify the identity of the human subject based on the measured spectral signature. In some examples, the face identification machine 126 may be configured to analyze just the portions of the spectral light images 116 within a bounding box around a recognized but unidentified face. In other examples, the face identification machine 126 may analyze a larger portion of the spectral light images 116 to identify faces of recognized human subjects. Such facial identification may allow the monitoring computing system to identify specific shoppers and retail employees in order to accurately issue appropriate retail actions for an object for purchase based on identifying an interaction between the human subject and the object.

Because the camera(s) 102 are configured to acquire both depth images and a plurality of spectral light images in different spectral light sub-bands on the same sensor array, a backscattering (albedo) coefficient for an imaged object or human subject may be accurately calculated in each of the sub-bands of spectral light. This allows the machines 124, and 126 to accurately determine a true spectral signature of the subject that is minimally or not biased by ambient light. As such, the limitations of traditional recognition techniques including time-dependent factors (e.g., pose, facial expressions) and environmental factors (e.g., ambient color temperature or intensity) may be overcome to increase the accuracy of recognition and/or identification. In other words, the recognition/identification performed by the monitoring computing system may be robust due to the ambient invariance of the imaging performed by the camera(s).

The machines 110, 122, 124, 126 may employ any suitable combination of state-of-the-art and/or future machine learning (ML) and/or artificial intelligence (AI) techniques. Non-limiting examples of such techniques include support vector machines, multi-layer neural networks, convolutional neural networks (e.g., including spatial convolutional networks for processing images and/or videos), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, the methods and processes utilized by the machines 110, 122, 124, 126 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the machines 110, 122, 124, 126.

The monitoring computer system 120 may include a retail action machine 128 configured to computer issue a retail action to be performed for an object for purchase in response to identifying an interaction between a human subject and the object for purchase. The retail action machine 128 may computer issue any suitable retail action in relation to the object for purchase. In some examples, the retail action may be dependent on the human subject that is interacting with the object. For example, if the human subject is identified as a shopper, then the retail action may include associating the object with the shopper. In one example, the retail action may include adding a cost associated with the object to a shopping tab or invoice associated with the shopper.

In some examples, the retail action may be dependent on the type of interaction that the human subject has with the object. For example, the retail action may include adding a cost associated with the object to a shopper tab responsive to the shopper placing the object in a shopping cart or basket. In another example, the retail action may include sending to a retail computing system 130 associated with a retail employee a notification to restock the object for purchase. In another example, if a shopper picks the object up off a shelf and then places it back in the same spot, then the retail action may include sending to the retail computing system 130 a notification to visually inspect the object for any damage or quality defects. In yet another example, if a shopper picks the object up off a shelf and then places it back in a different spot, then the retail action may include sending to the retail computing system 130 a notification to return the object for purchase back to the designated spot on the shelf.

The machines 110, 122, 124, 126, 128 may be implemented as any suitable physical hardware and/or firmware component. In some implementations, the machines 110, 122, 124, 126, 128 may be combined in a shared enclosure. In some implementations, aspects of the machines 110, 122, 124, 126, 128 and camera(s) 102 may be integrated together into one or more hardware-logic components. In some implementations, aspects of the machines 110, 122, 124, 126, 128 may be implemented on a computing system that is remote from the camera(s) 102. For example, aspects of the machines 110, 122, 124, 126, 128 may be implemented via a service computing system in communication with the camera(s) 102 via the computer network 118.

In some implementations, the camera system 100 may include one or more additional peripheral sensors 132 that may be used in addition to the depth and spectral light images to identify interactions between human subjects and objects for purchase in the retail shopping area. In one example, the peripheral sensor(s) 132 may include pressure sensors. In some examples, peripheral pressure sensors may be integrated into shelves and/or other retail fixtures. In such examples, the peripheral pressure sensors may be configured to generate a pressure signal that indicates whether or not the object for purchase is present or has been taken from a designated position. Further, in some such examples, the pressure signal may indicate a weight of the object when it is removed from the designated position. The weight may be used to calculate the cost of the object in bulk item scenarios. In another example, a peripheral pressure sensor may be integrated into a shopping cart or basket and may be configured to generate a pressure signal that indicates when an object is placed into the shopping cart or basket. Such an indication may be used to issue a retail action that adds the cost of the object to a shopper's tab.

Any suitable type of peripheral sensor may be employed in the camera system 100 to provide additional information for identifying interactions between human subjects and objects for purchase in a retail shopping area.

While a retail shopping area is used as an example, it is to be understood that other areas where humans interact with objects may be monitored in this manner, and other, non-retail, actions related to the humans, objects, and/or areas may be performed.

Figure 2:
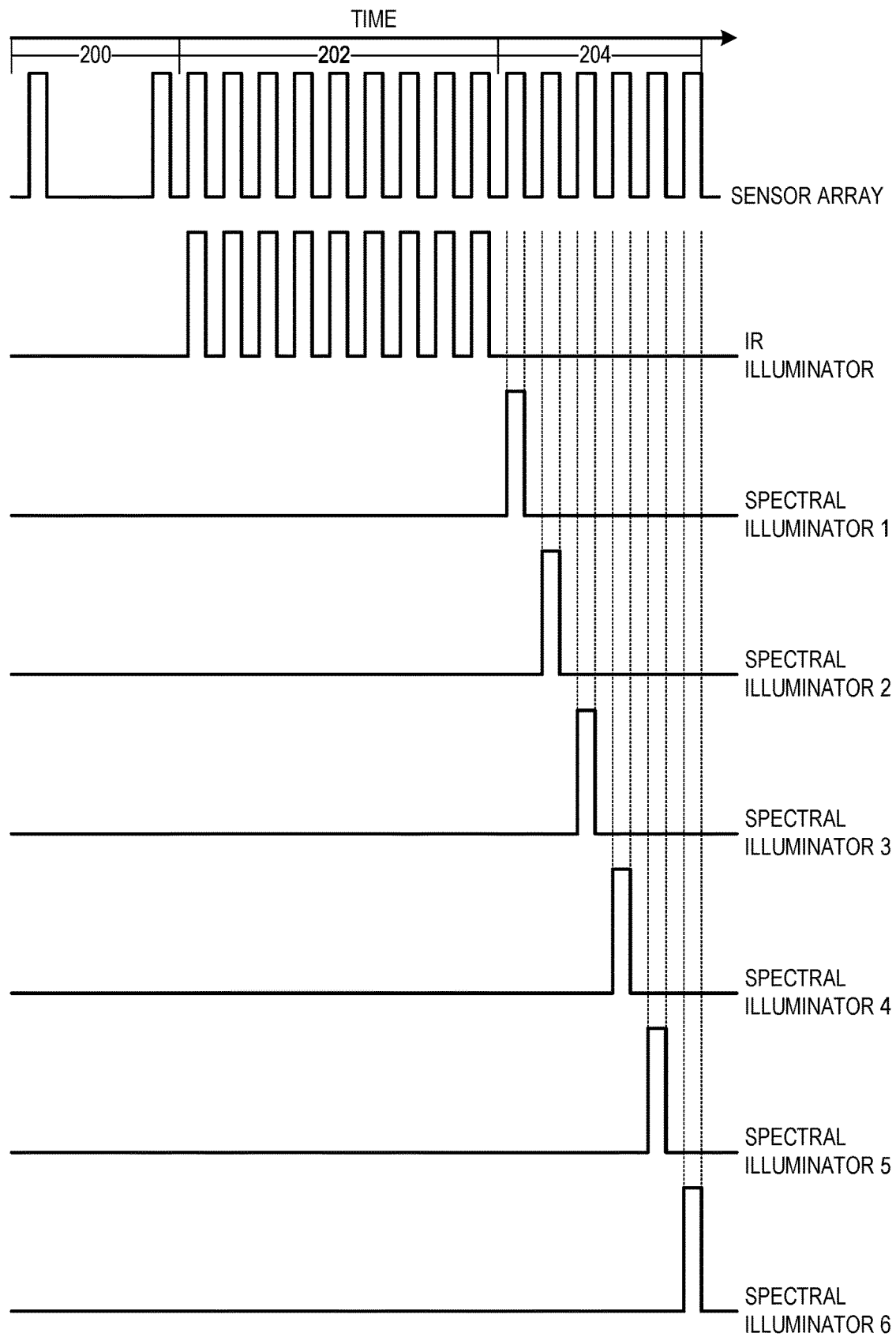
FIG. 2 schematically shows an example power-saving image acquisition sequence of a depth+multi-spectral camera system configured for automatic computer monitoring of an area.

FIG. 2 shows an example sequence of operation of the camera 102 of FIG. 1 during different modes of operation with different illumination sources for different types of image acquisition. Note that only activation and deactivation times of the different illuminators and the sensor array are depicted. It will be appreciated that parameters of the light (e.g., frequency, amplitude) may be modulated within each activation/deactivation cycle for the different illuminators. For example, during each activation and/or across two or more successive activations, the IR illuminator may modulate the frequency of IR illumination. During an ambient-light image acquisition period 200, the camera 102 operates in the low-power mode. In particular, the sensor array is addressed twice while the IR illuminator and the plurality of spectral illuminators remain deactivated to acquire two ambient-light images. The camera 102 may repeat the ambient-light image acquisition period for as long as no above-threshold motion is detected in an ambient-light image. The camera 102 may acquire any suitable number of ambient light-images during the ambient-light image acquisition period 200. In some examples, the frame rate in the ambient-light image acquisition period 200 may be lower than the frame rate in other image periods (e.g., 202, 204) in order to reduce power consumption of the camera 102.

In response to above-threshold motion being detected in an ambient-light image, the camera switches to operation in the high-power mode and begins an IR image acquisition period 202. In particular, the IR illuminator is activated on a periodic basis for nine IR illuminator activations and the sensor array is addressed in synchronicity with the activations of the IR illuminator to acquire nine IR images. The nine IR images correspond to different modulation frequencies and phases that may be used to determine a depth of an imaged subject. In other words, the nine IR images may constitute a depth image. In this example, the activations of the IR illuminator occur rapidly in succession while the plurality of spectral illuminators remain deactivated during the period 202. In other examples, less than nine IR image captures may be performed to determine the depth information. The IR image acquisition period 202 may be repeated until a human subject is identified in a depth image (or the camera switches back to low-power mode).

In response to identifying the human subject, the spectral illuminators are sequentially activated while the IR illuminator remains deactivated during a multi-spectral light image acquisition period 204. The sensor array is addressed in synchronicity with activations of each of the plurality of spectral illuminators to acquire spectral light images in each of the spectral light sub-bands of the plurality of spectral illuminators. The spectral light images may be computer analyzed to identify an interaction between the identified human subject and an object for purchase. Further, a retail action to be performed for the object for purchase may be computer issued based on identifying the interaction between the human subject and the object for purchase.

In some examples, the IR image acquisition period 202 and the multi-spectral light image acquisition period 204 may be alternately repeated to determine the depth and spectral values for object and human subject recognition. It will be appreciated that the IR illuminator and the plurality of spectral illuminators may be activated, and the sensor array may be addressed according to any suitable timing strategy.

FIGS. 3A-3D show example scenarios for automatic computer monitoring of a retail shopping area 300. The retail shopping area 300 includes a plurality of aisles 302 (e.g., 302A, 302B) that are separated by a plurality of shelves 304 (e.g., 304A, 304B, 304C). Each shelf 304 may be stocked with a plurality of different objects 306 for purchase. A plurality of cameras 102 (e.g., 102A, 102B) may be deployed to monitor the retail shopping area 300. In the depicted example, the plurality of cameras 102 are ceiling-mounted such that the plurality of cameras 102 are positioned above the retail shopping area 300. The plurality of cameras 102 may be aimed such that a field of view 310 of each camera covers a different portion of the retail shopping area 300. For example, each camera 102 may be aimed such that the field of view includes at least a portion of a shelf 304 with a plurality of objects 306 for purchase, as well as at least a portion of an aisle 302 where a human subject, such as a shopper or a retail employee may be monitored. In some cases, the fields of view of different cameras may at least partially overlap such that multiple cameras cover a same portion of the retail shopping area 300.

In some cases, the IR illuminator 106 and the plurality of spectral illuminators 108 of a camera 102 may be configured to illuminate a same portion of the retail shopping area 300. In other words, the IR illuminator 106 and the plurality of spectral illuminators 108 may have a same field of illumination. The field of illumination of one or more of the IR illuminator 106 and the plurality of spectral illuminators 108 may be the same or different than the field of view 310 of the camera 102. In some cases, the IR illuminator 106 and the plurality of spectral illuminators 108 of a camera 102 may be configured to illuminate different portions of the retail shopping area 300. In some such cases, the different portions illuminated by the IR illuminator 106 and the spectral illuminators 108 may at least partially overlap. For example, the different illuminators may have fields of illumination that may be slightly shifted relative to each other based on a distance between the different illuminators.

Additionally, the retail shopping area 300 may include a plurality of ambient lights 312 (e.g., 312A, 312B, 312C). The ambient lights 312 may be deployed intermittently between different cameras 102. The plurality of ambient lights 312 may be configured to emit broad-band white light, for example, to illuminate the retail shopping area 300 so that the objects 306 for purchase may be clearly visible to human subjects in the retail shopping area 300. The broad-band white light emitted by the ambient lights 312 may conceal the narrow-band active spectral light emitted by the spectral illuminators 108 of the cameras 102. In this way, a human subject may not notice operation of the plurality of cameras 102 when the cameras acquire spectral light images. Moreover, the broad-band ambient light should not exceed a threshold level to keep a signal-to-noise ratio of depth and multi-spectral imaging sufficiently high.

Figure 3A:
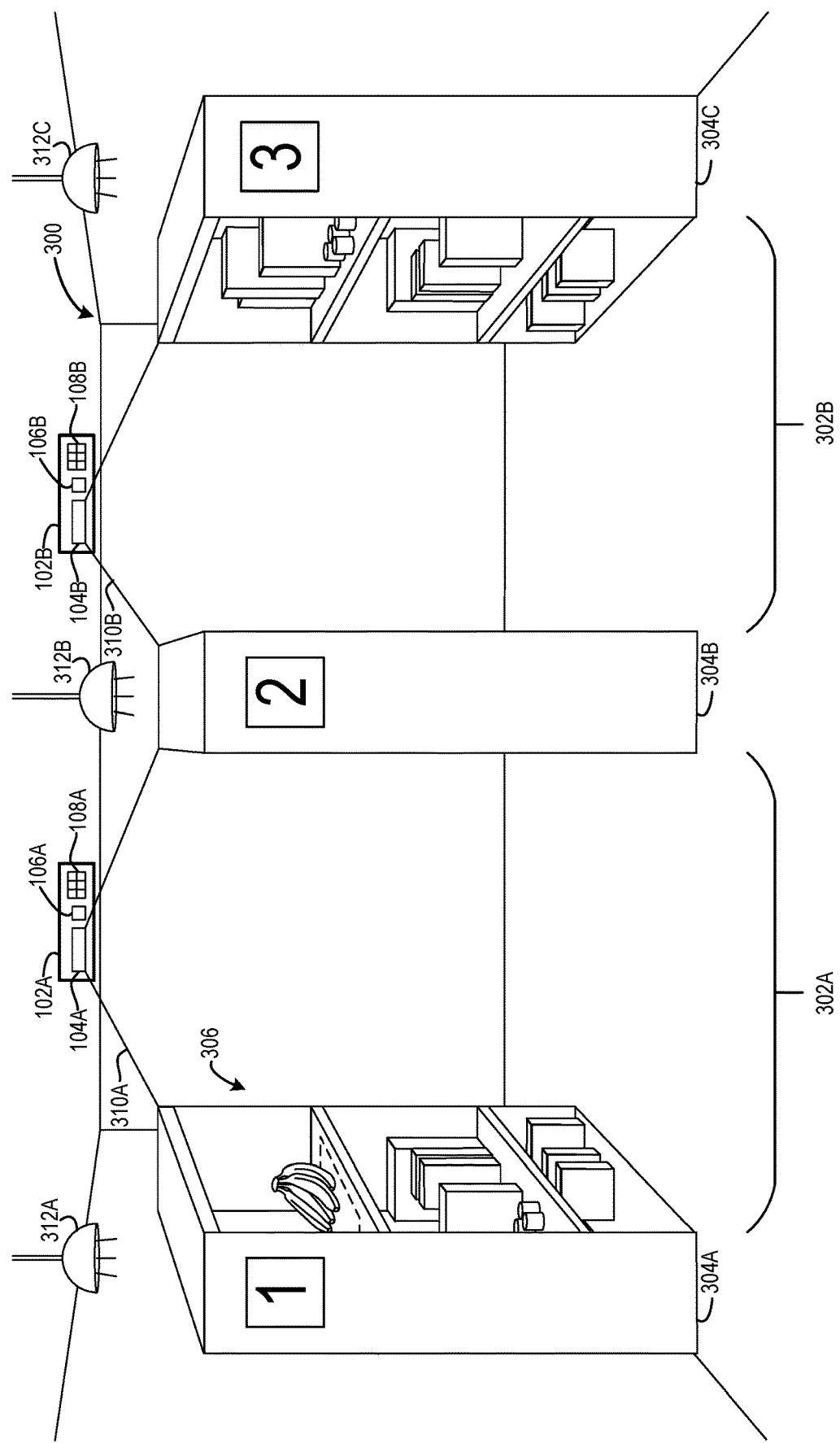
FIGS. 3A-3D show example scenarios for automatic computer monitoring of an area.

In FIG. 3A, each of the plurality of cameras 102 is operating in low-power mode in which with the IR illuminator 106 and the plurality of spectral illuminators 108 remain deactivated such that the cameras 102 may acquire ambient light images. The ambient light images are computer analyzed to identify above-threshold motion. Each of the plurality of cameras 102 is operating in the low-power mode, because no camera 102 has acquired an ambient light image that includes above-threshold motion.

Figure 3B:
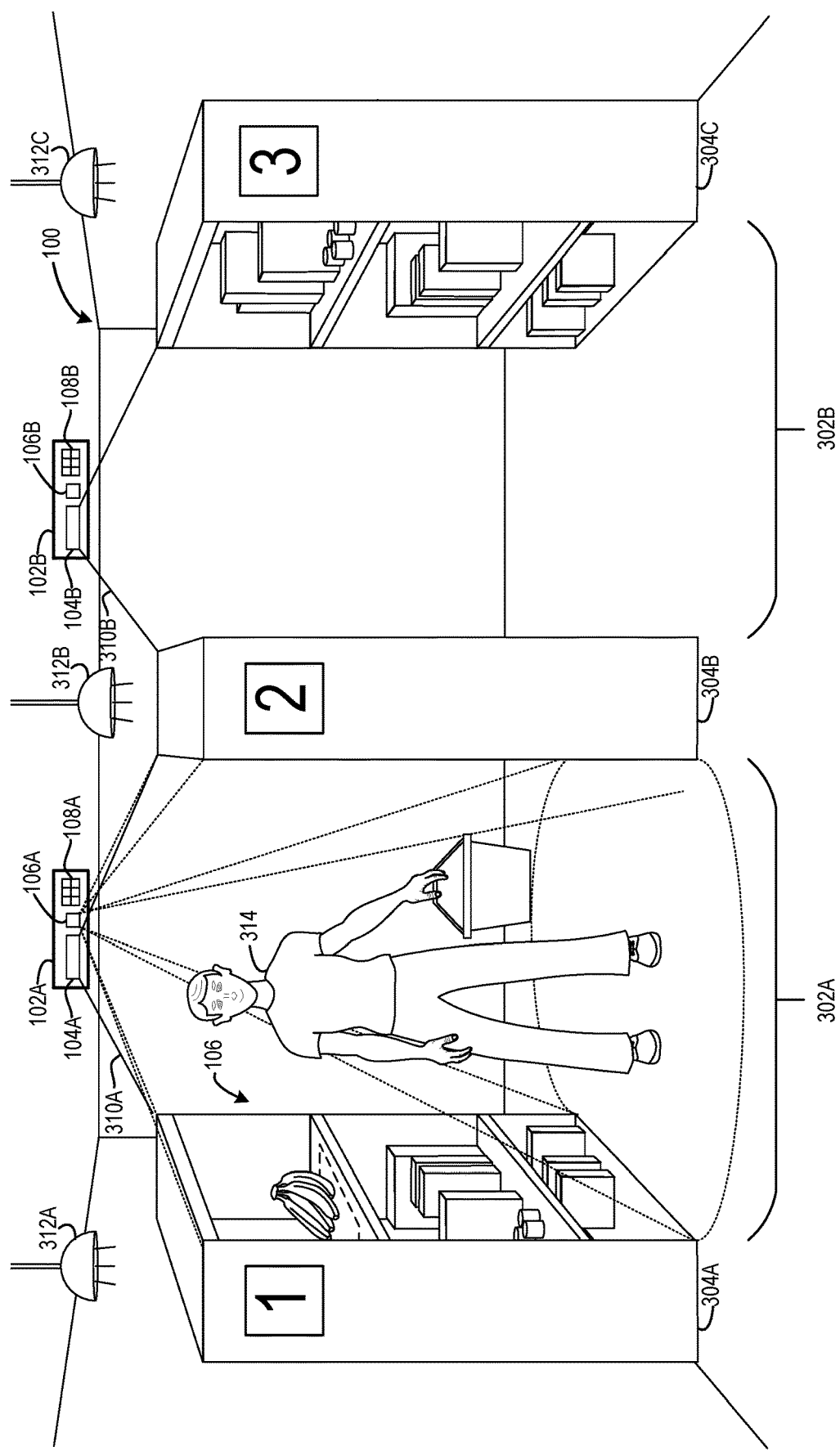

In FIG. 3B, a human subject 314 has moved into the first aisle 302A and entered the field of view 310A of the first camera 102A. The motion of the human subject 314 triggers identification of above-threshold motion in ambient light images acquired by the first camera 102A causing the first camera 102A to switch to operation in the high-power mode. In particular, the first camera 102A activates the IR illuminator 106A and addresses the sensor array 104A to acquire depth images. The depth images are computer analyzed to identify the human subject. Meanwhile, the second camera 102B remains in the low-power mode because no above-threshold motion is identified in the ambient light images acquired by the second camera 102B.

Figure 3C:
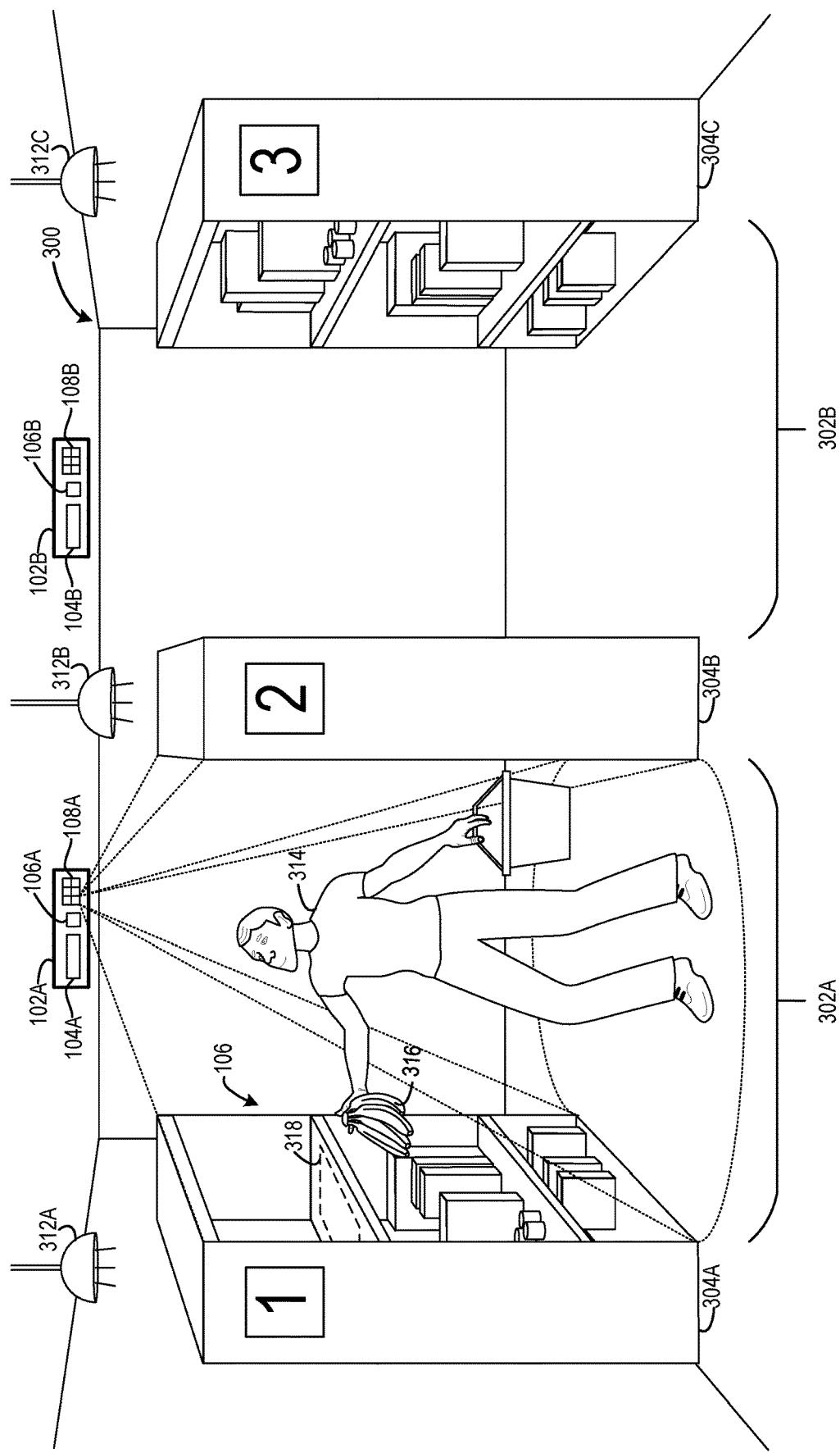

In FIG. 3C, the human subject 314 has been identified as a shopper and the first camera 102A activates each of the plurality of spectral illuminators 108A one at a time and addresses the sensor array 104A to acquire spectral light images in spectral light sub-bands of each of the plurality of spectral illuminators 108A. The plurality of spectral light images is computer analyzed to identify an interaction between the identified human subject 314 and an object for purchase. In the depicted example, the shopper has picked up a bunch of bananas 316 off of the first shelf 304A. This interaction may be identified based on spectral images acquired by the first camera 102 and a retail action for the bunch of bananas 316 may be issued based on the identified interaction. In one example, the retail action may include a cost of the bunch of bananas 316 being added to a shopping tab that is being tracked for the shopper 314.

In some examples, the cost of the bunch of bananas 316 may be based on a weight of the bananas. In such some examples, the weight of the bunch of the bananas 316 may be derived from a volume of the bananas that is determined via computer analysis of the plurality of spectral images. In other such examples, a pressure sensor 318 incorporated into the first shelf 304A may provide an indication of the weight of the bunch of bananas 316.

Figure 3D:
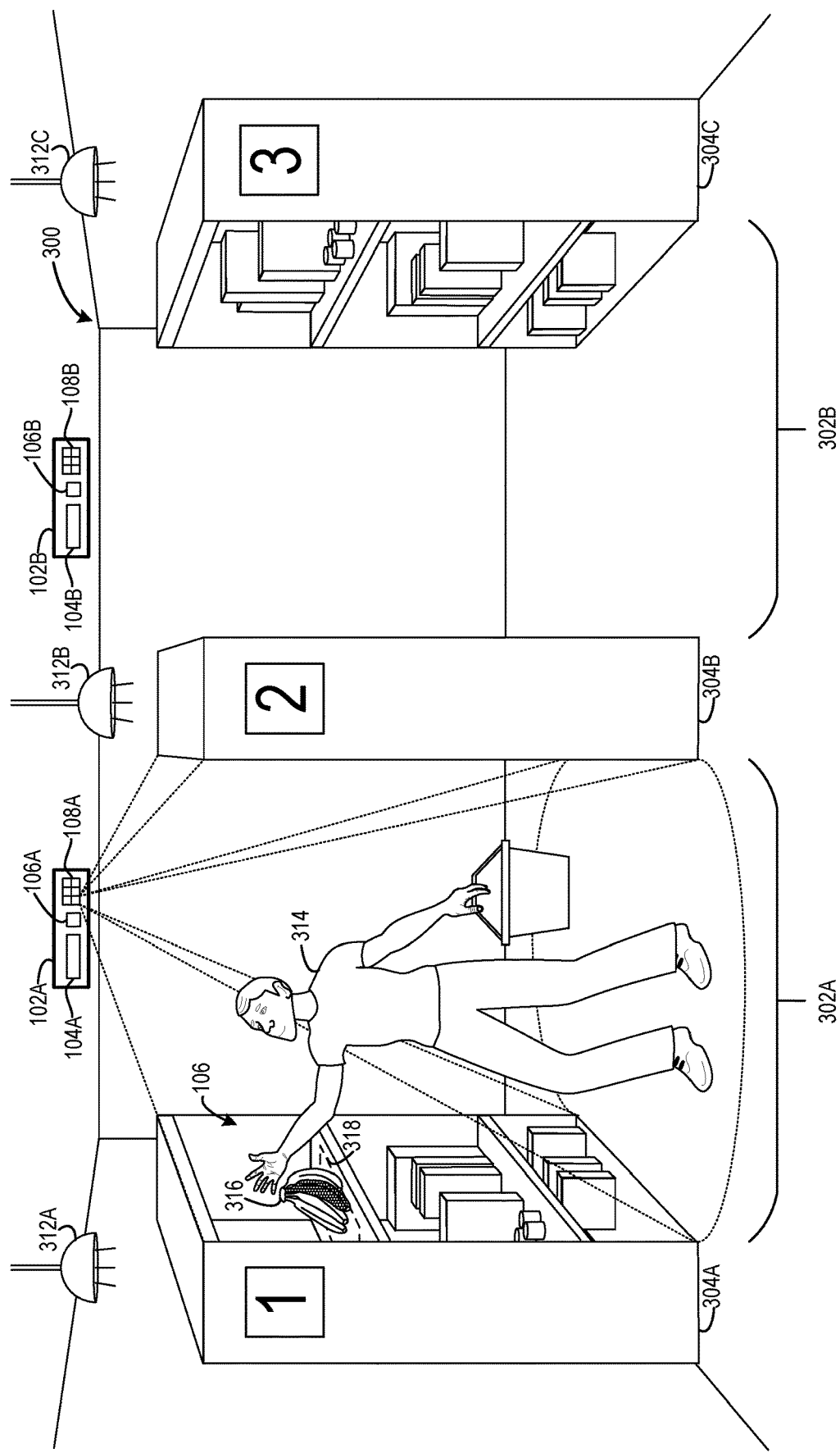

In another example scenario shown in FIG. 3D, after the shopper 314 has picked up the bunch of bananas 316 off the shelf and inspected them, the shopper 314 may place the bunch of bananas 316 back on the shelf. For example, the shopper 314 may realize that one of the bananas is rotten. This interaction between the shopper 314 and the bunch of bananas 316 may be identified from the spectral light images acquired by the first camera 102A. Accordingly, a retail action may be issued that includes a notification to a retail employee to come inspect the quality of the bananas 316 and potentially remove and replace them with other bananas. In some examples, the retail action may be further issued based on receiving sensor signals from the pressure sensor 318 that indicate that the bunch of bananas 316 were placed back on the shelf.

The above described scenarios are meant to be non-limiting. It will be appreciated that the plurality of cameras 102 may be deployed in any suitable arrangement to image both the objects 106 for purchase and the human subjects that may interact with the objects for purchase. In other implementations, the cameras 102 may be incorporated into head-mounted devices worn by human subjects, such as shoppers or retail employees in the retail shopping area. In yet other implementations, the cameras 102 may be incorporated into shopping carts or baskets. While a retail shopping area is used as an example, it is to be understood that other areas where humans interact with objects may be monitored in this manner, and other, non-retail, actions related to the humans, objects, and/or areas may be performed.

Figure 4:
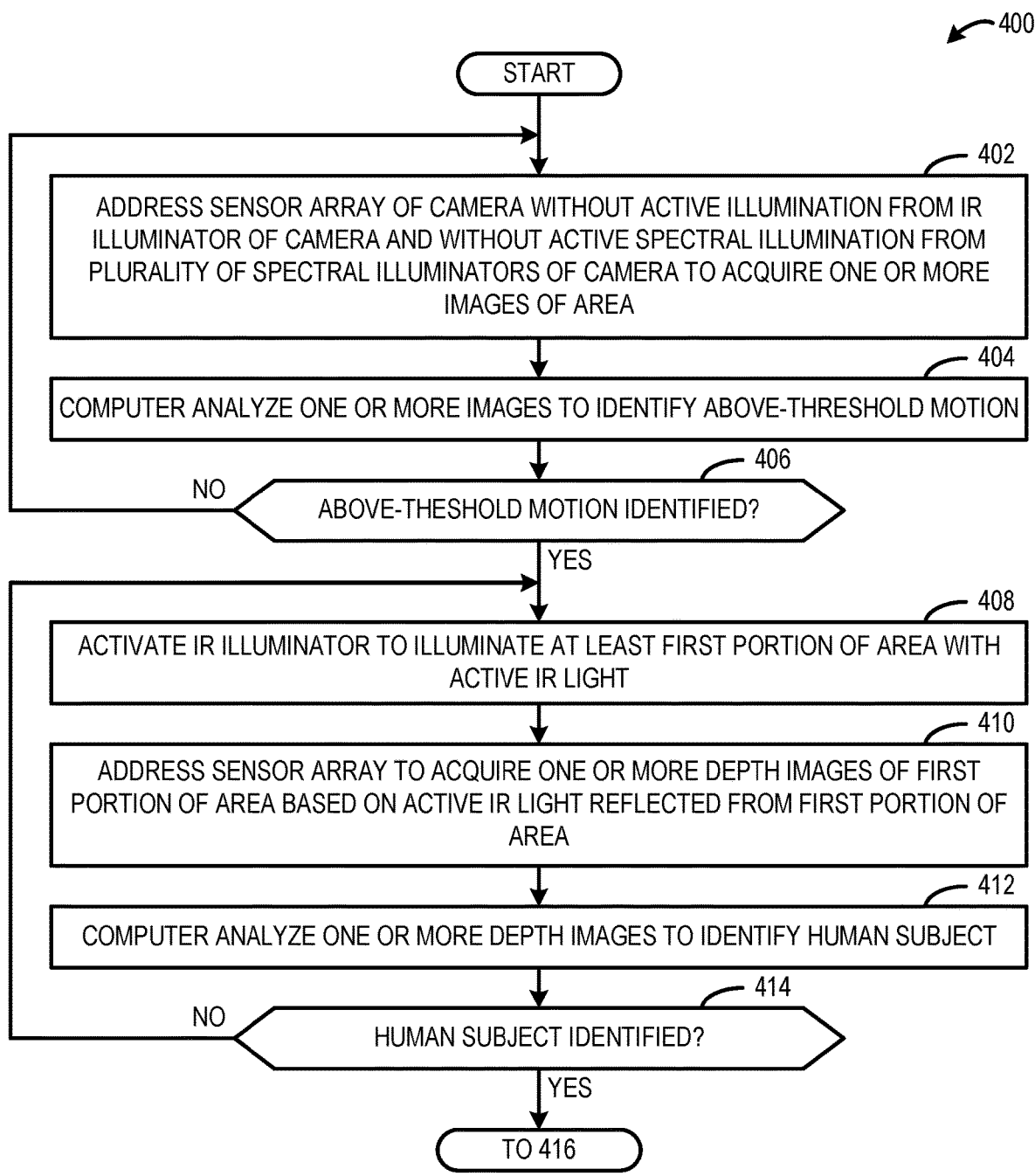
FIGS. 4 and 5 are a flowchart of an example method for automatically monitoring an area.
Figure 5:
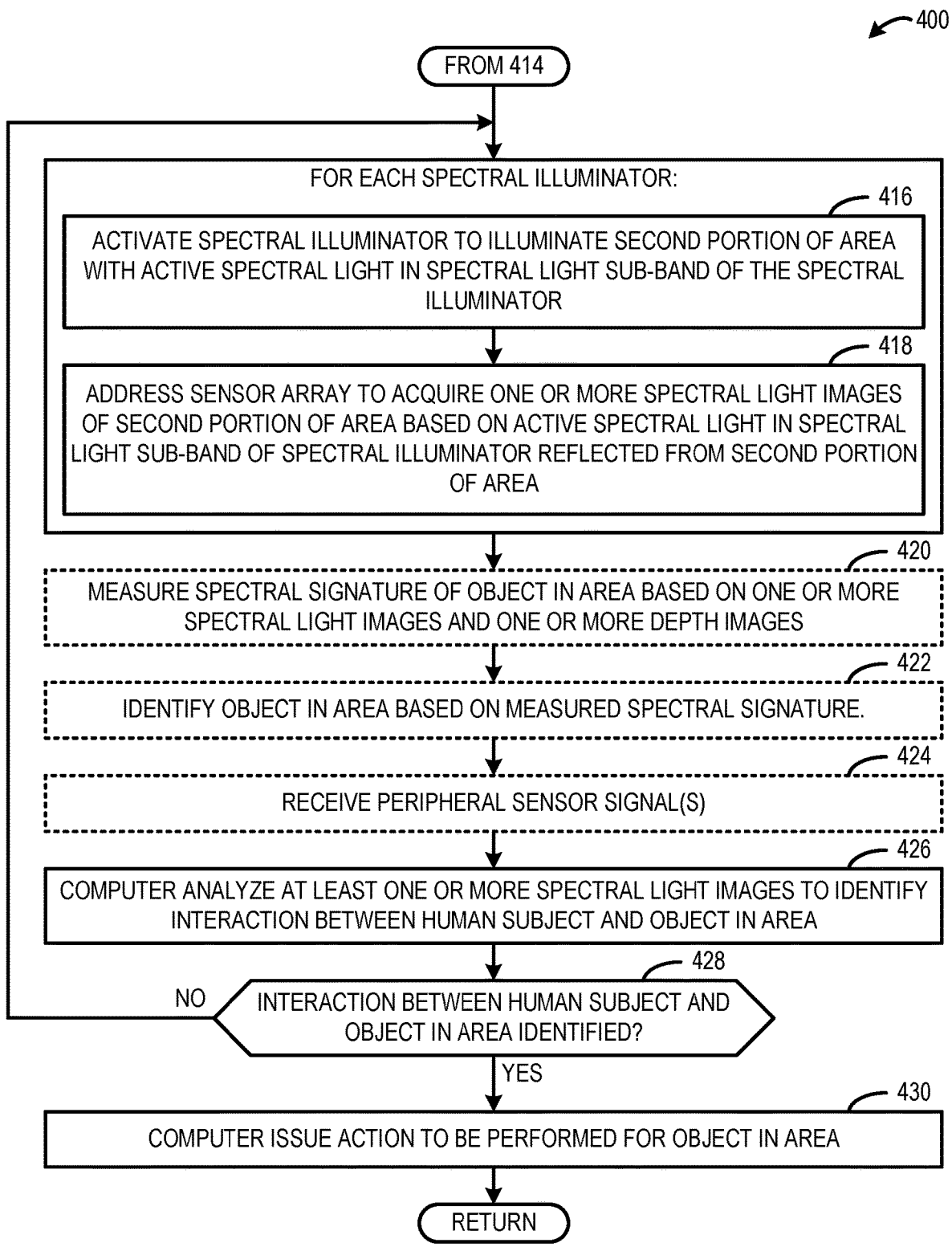

FIGS. 4 and 5 show a method 400 for automatically monitoring an area where humans interact with objects, such as a retail shopping area. The area is monitored using one or more depth+multi-spectral cameras, such as camera(s) 102 of FIG. 1. For example, method 400 may be enacted by camera system 100 of FIG. 1.

In FIG. 4, at 402, the method 400 includes addressing a plurality of sensors of a sensor array of the camera without active illumination from an IR illuminator of the camera and without active spectral illumination from a plurality of spectral illuminators of the camera to acquire one or more images of the area. Such images may be referred to as ambient light images.

At 404, the method 400 includes computer analyzing the one or more ambient light images to identify an above-threshold motion. At 406, the method 400 includes determining whether an ambient light image includes an above-threshold motion. If an above-threshold motion is identified in an ambient light image, then the method 400 moves to 408. Otherwise, the method 400 returns to 402 and additional ambient light images are acquired and computer analyzed.

At 408, the method 400 includes activating the IR illuminator to illuminate at least a first portion of the area with the active IR light. At 410, the method 400 includes addressing the plurality of sensors of the sensor array to acquire one or more depth images of the first portion of the area based on active IR light reflected from the first portion of the area. At 412, the method 400 includes computer analyzing the one or more depth images to identify a human subject. At 414, the method 400 includes determining whether a depth image includes a human subject. If a human subject is identified in a depth image, then the method 400 moves to 416. Otherwise, the method 400 returns to 408 and additional depth images are acquired and computer analyzed.

In response to identifying the human subject, spectral images may be acquired for each spectral light sub-band of the plurality of spectral illuminators of the camera. In particular, in FIG. 5, at 416, the method 400 includes activating the spectral illuminator to illuminate a second portion of the area with the active spectral light in a spectral light sub-band of the spectral illuminator. In some examples, the second portion of the area may be the same portion as the first portion of the area. In some examples, the second portion of the retail shopping area may include a different portion than the first portion of the area. For example, the two different portions may be proximate to one another, but may shifted based on a distance between the IR illuminator and the spectral illuminator. At 418, the method 400 includes addressing the plurality of sensors of the sensor array to acquire one or more spectral light images of the second portion of the area based on active spectral light in the spectral light sub-band of the spectral illuminator reflected from the second portion of the area.

In some implementations, at 420, the method 400 optionally may include measuring a a spectral signature of an object in the area based on the one or more spectral light images and the one or more depth images. In some implementations, at 422, the method 400 optionally may include computer identifying the object in the area based on the measured spectral signature.

In some implementations, at 424, the method 400 optionally may include receiving sensor signal(s) from one or more peripheral sensors. In one example, a peripheral sensor may include a peripheral pressure sensor configured to generate a pressure signal that indicates whether or not an object is positioned on the pressure sensor.

At 426, the method 400 includes computer analyzing at least the one or more spectral light images to identify an interaction between the human subject and an object in the area. In some implementations, the interaction between the human subject and the object in the area may be identified further based on the signal(s) received from the peripheral sensor(s) (e.g., the pressure signal).

At 428, the method 400 includes determining whether an interaction between the human subject and the object in the area is identified in the one or more spectral images. If an interaction between the human subject and the object in the area is identified, the the method 400 moves to 430. Otherwise, the method 400 returns to 416 and additional spectral light images are acquired and computer analyzed.

At 430, the method 400 includes computer issuing an action to be performed for the object in the area in response to identifying the interaction between the human subject and the object in the area. In some examples, the human subject may be identified as a shopper, and the action may include a retail action of computer associating the object with the shopper. In some examples, the action may include a retail action of sending to a retail computer a notification to restock the object in the area. In some examples, the action may include a retail action of sending to a retail computer a notification to inspect the object in the area. Any suitable action may be computer issued in response to identifying an interaction between the human subject and the object in the area.

Figure 6A:
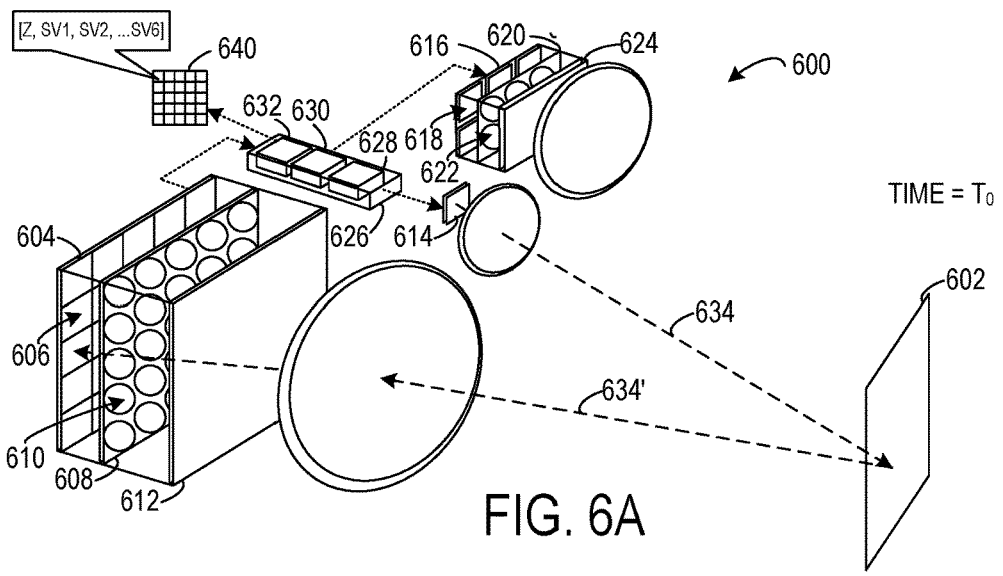
FIGS. 6A-6C are exploded, schematic views showing aspects of an example camera.
Figure 6B:
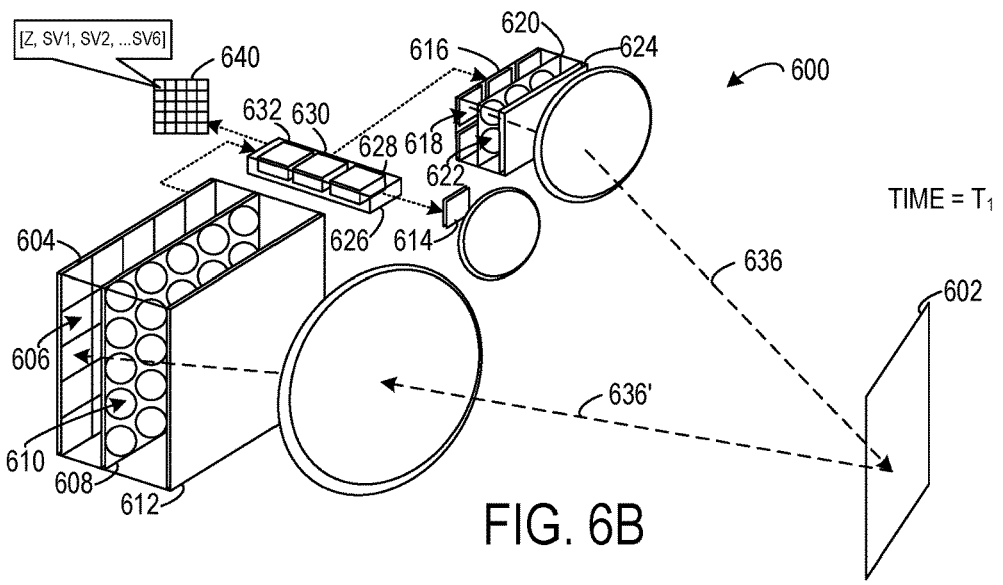
Figure 6C:
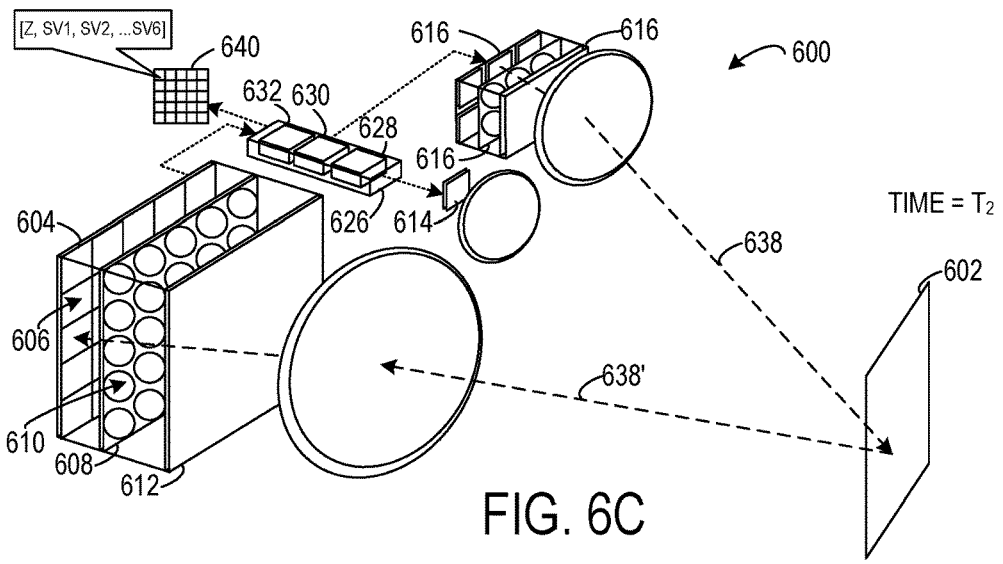

FIGS. 6A-6C show aspects of an example camera 600. For example, the camera 600 may take the form of camera 102 shown in FIGS. 1 and 3A-3D. The term 'camera' refers herein to any imaging component having at least one optical aperture and sensor array configured to image a scene or subject 602. Camera 600 includes sensor array 604 of individually addressable sensors 606. In some implementations, the sensors may be complementary metal-oxide semiconductor (CMOS) elements, but other suitable architectures are envisaged as well. Each sensor is responsive to light over a broad wavelength band. For silicon-based sensors, the wavelength response may range from 300 to 1100 nm, for example. Sensor array 604 is schematically illustrated with only twenty-five sensors 606 for simplicity, although there is no theoretical limitation to the number of sensors 606.

In some implementations, the sensors 606 of sensor array 604 may be differential sensors. Each differential sensor may include different collection regions that are energized according to two different clock signals. In one example, to measure modulated active illumination, the two clock signals may be substantially complementary (e.g., the two clock signals have 50% duty cycles that are 180 degrees out of phase). In other examples, the two different clock signals may have a different relationship, such as for measuring ambient illumination or non-modulated active illumination. When the different regions are activated based on the corresponding clock signal, electric fields are created that attract and collect photoelectric charges in the different regions. The different regions may be separated by shallow trench isolation (STI). In another example, a p-type doped area may create a barrier that ensures charges collected in one region do not transfer to an adjacent region even if one is at a higher potential.

Such operation allows for the same sensor array to be used to measure active light across a broad spectrum including ultraviolet, visible, NIR, and IR light. Further, the differential sensors may reduce system noise because only one read operation is required to perform a differential measurement of active spectral light and ambient light (i.e., (active light plus ambient light) minus ambient light). In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

Microlens array 608 optionally may be arranged directly over sensor array 604. Microlens array 608 includes a plurality of microlens elements 610. Each microlens element 610 of microlens array 608 may be registered to a differential sensor 606 of the sensor array 604. When included, microlens array 608 may provide a larger effective fill factor at each of the sensors, for increased collection efficiency and reduced cross-talk between pixels.

Optical shutter 612 optionally may be arranged over sensor array 604, so as to optically cover the sensor array. When included, the optical shutter 612 is switchable electronically between different light-filtering states. In one example, the optical shutter 612 may include two or more light filtering states. In one filtering state, the optical shutter 612 may transmit IR light and block light outside of the IR band (e.g., visible light). In another filtering state, the optical shutter 612 may transmit visible light and block light outside of the visible light sub-band (e.g., IR light). The optical shutter 612 may increase a signal-to-noise ratio of IR images and visible light images acquired by the sensor array 604. The optical shutter 612 may include any suitable type of filter that transmits a narrow-band of light without significantly reducing the intensity of the in-band signal received by the sensor array. In one example, the optical shutter may include one or more liquid crystal layers.

In some implementations, the optical shutter may be omitted from the camera 600. For example, the optical shutter may be omitted in order to reduce a cost and/or complexity of an imaging optical stack. In some cases, omitting the optical shutter may allow the imaging optical stack to have a larger field of view, because an imaging lens can be designed without the added complexity of having a tunable filter in the imaging optical stack.

An IR illuminator 614 is configured to emit active IR light to illuminate the scene 602. In one example, the IR illuminator 614 includes an IR laser configured to emit IR light. In some implementations, the IR illuminator 614 optionally may include a diffuser positioned in between the IR illuminator 614 and the scene 602. The diffuser may diffuse IR light emitted from the IR illuminator 614 to produce a field of illumination that illuminates the scene 602 with IR light.

A spectral illumination source 616 is configured to emit active spectral light to illuminate the scene 602. The spectral illumination source may include one or more spectral illuminators 618. In the depicted implementation, the spectral illumination source 616 includes six spectral illuminators 618. In some implementations, the plurality of spectral illuminators 618 each may be configured to emit active spectral light in a different sub-band. In some implementations, multiple illuminators may emit active spectral light in overlapping sub-bands. Each of the spectral illuminators may be individually controllable—e.g., a single spectral illuminator may be activated while the other spectral illuminators remain deactivated. The plurality of spectral illuminators 618 may take any suitable form. In one example, the spectral illuminators 618 include light emitting diodes (LEDs) configured to emit active spectral light. There is not a theoretical limit on the number of spectral illuminators that may be used, nor on the spectral-light sub-bands that each spectral illuminator may be configured to emit.

In one example implementation, a camera may include, in addition to the IR source 614, six spectral illuminators respectively configured to emit deep blue (460 nm), blue (470 nm), true green (528 nm), yellow (587 nm), amber (617 nm), and red (625 nm). In an example implementation, each spectral illuminator may have a full width at half maximum (FWHM) of 20 nm, and a field of illumination (FOI) of 80 degrees. While not required, the camera 600 typically includes more than three spectral illuminators. In some implementations, the spectral illuminators may emit light in other sub-bands, such as hyper-red, near IR, or IR.

In other implementations, a camera may include a broad-band illumination source, such as a white light source. The broad-band illumination source may be employed instead of the plurality of spectral illuminators. In some implementations, the broad-band illumination source may be modulated. In other implementations, the broad-band illumination source may be un-modulated. In general, although the camera 600 is described in the context of a multi-/hyper-spectral+depth camera capable of acquiring both multi-spectral light image data and depth data, both of these features are optional.

Collimating lens array 620 optionally may be arranged directly in front of the plurality of spectral illuminators 618. Collimating lens array 620 includes a plurality of collimating lenses 622. Each collimating lens 622 of collimating lens array 620 may be registered to a different spectral illuminator 618 such that each collimating lens is operatively intermediate the corresponding spectral illuminator 618 and the scene 602. Each collimating lens 622 is configured to collimate active spectral light emitted from the corresponding spectral illuminator 618.

A tunable optical filter 624 optionally may be arranged optically intermediate the spectral illumination source 616 and the scene 602. When included, the tunable optical filter 624 is configured to receive active spectral light emitted from the spectral illumination source 616 and selectively transmit active spectral light in a selected sub-band to illuminate the scene 602. The tunable optical filter 624 may be configured to substantially block spectral light outside of the selected sub-band. For example, the selected sub-band may be a narrow sub-band (e.g., having a transmission peak of approximately 1 nm). The tunable optical filter 624 is dynamically adjustable to change a selected sub-band of the active spectral light that illuminates the scene 602. For example, the tunable optical filter 624 may be dynamically adjusted to transmit spectral light in a selected sub-band (e.g., 470 nm) and substantially block spectral light outside of the selected sub-band. Subsequently, the tunable optical filter 624 may be dynamically adjusted to transmit spectral light in another narrow sub-band (e.g., 475 nm) and substantially block spectral light outside of the selected sub-band. In this way, the tunable optical filter 624 may be dynamically adjusted to selectively transmit different narrow sub-bands within the emission band of at least one active spectral illuminator. It will be appreciated that the tunable optical filter may be dynamically adjusted to any suitable different sub-bands within any suitable emission band of a spectral illuminator. In another example, the tunable optical filter may be dynamically adjusted to transmit spectral light in different selected sub-bands that are within different emission bands of different spectral illuminators. In one example the tunable optical filter 624 may be adjusted to transmit spectral light at 470 nm with the emission band of a blue spectral illuminator. Subsequently, the tunable optical filter may be dynamically adjusted to transmit spectral light at 625 nm within the emission band of a red spectral illuminator. In this way, the tunable optical filter 624 may be dynamically adjusted to sequentially illuminate the scene 602 with active spectral light in a plurality of different sub-bands corresponding to each of a plurality of different emission bands of different spectral illuminators in order to acquire spectral light image data for multi- or hyper-spectral imaging.

Electronic controller 626 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 626 includes a depth controller machine 628, a spectral controller machine 630, and an output machine 632. Machines 628, 630, 632 may be implemented as separate physical hardware and/or firmware components or incorporated into a single hardware and/or firmware component.

The depth controller machine 628 is configured to activate the IR illuminator 614 and synchronously address the sensors 606 of sensor array 604 to acquire IR images. When optical shutter 612 is included, the depth controller machine 628 is further configured to switch the optical shutter 612 to block light outside of the IR light sub-band in synchronicity with activation of the IR illuminator 614 and address of the sensor array 604. In the example shown in FIG. 6A, at time $T_0$, the depth controller machine 628 adjusts the optical shutter 612, activates the IR illuminator 614 to illuminate the scene 602 with active IR light 634, and addresses the sensors 606 of sensor array 604 in synchronicity to measure an aspect of the active IR light emitted from the IR illuminator and reflected from the scene. In particular, IR light 634' reflects from the scene 602 back to the camera 600, is transmitted through the optical shutter 612, and is incident on the sensors 606 of the sensor array 604 for IR image acquisition. Note that the depth controller machine 628 may acquire a plurality of IR images in the process of acquiring a depth map.

FIG. 6B shows camera 600 measuring spectral light in a first selected sub-band emitted by a first spectral illuminator. In the depicted example, at time $T_1$, the spectral controller machine 630 activates the first spectral illuminator to emit active spectral light in the first selected sub-band (e.g., blue) and deactivates the other spectral illuminators of the plurality of spectral illuminators 618. The spectral controller machine 630 synchronously, dynamically adjusts the tunable optical filter 624 to selectively transmit active spectral light in the first selected sub-band (e.g., blue) while substantially blocking light outside of the first selected sub-band, thus illuminating the scene 602 in active spectral light 636 in the first selected sub-band (e.g., blue). Active spectral light 636' in the first selected sub-band reflects from the scene 602 back to the camera 600 and is incident on the sensors 606 used to measure the depth to scene 602. The spectral controller machine 630 synchronously addresses the sensors 606 of sensor array 604 to acquire spectral light image data for the first selected sub-band (e.g., blue).

In some examples, the spectral controller machine 630 may change (e.g., tune) the transmission wavelength of the tunable optical filter 624 to sequentially select multiple narrow sub-bands that are within the emission band or spectrum of the blue spectral illuminator to acquire spectral data for the different narrow sub-bands.

Further, as shown in FIG. 1C, at time $T_2$, the spectral controller machine 622 activates a second spectral illuminator to emit active spectral light in a second selected sub-band (e.g., green) and deactivates other spectral illuminators of the plurality of spectral illuminators 618. The spectral controller machine 630 synchronously, dynamically adjusts the tunable optical filter 624 to selectively transmit active spectral light in the second selected sub-band (e.g., green) while substantially blocking light outside of the second selected sub-band, thus illuminating the scene 602 in active spectral light 638 in the second selected sub-band (e.g., green). Active spectral light 638' in the second selected sub-band reflects from the scene 602 back to the camera 600 and is incident on the sensors 606 used to measure the depth to scene 602. The spectral controller machine 630 synchronously addresses the sensors 606 of sensor array 604 to acquire spectral light image data for the second selected sub-band (e.g., green).

In some examples, the spectral controller machine 630 may change (e.g., tune) the transmission wavelength of the tunable optical filter 624 to sequentially select multiple narrow sub-bands that are within the emission band or spectrum of the green spectral illuminator to acquire spectral data for the different narrow sub-bands.

Figure 7A:
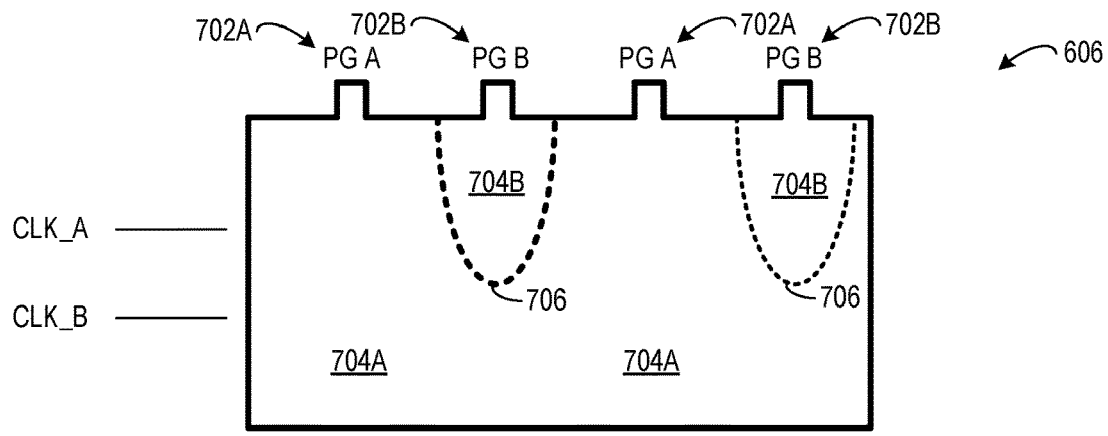
FIGS. 7A-7C schematically show a differential sensor of a sensor array.
Figure 7B:
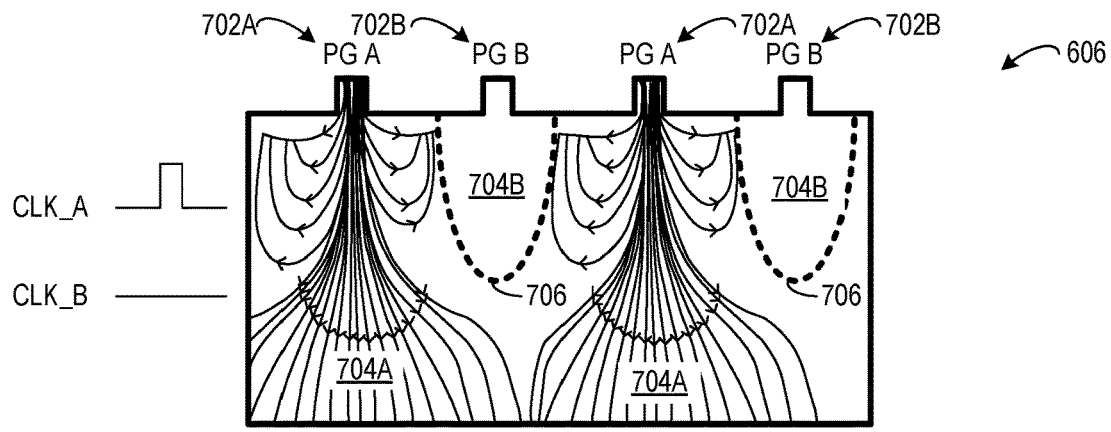
Figure 7C:
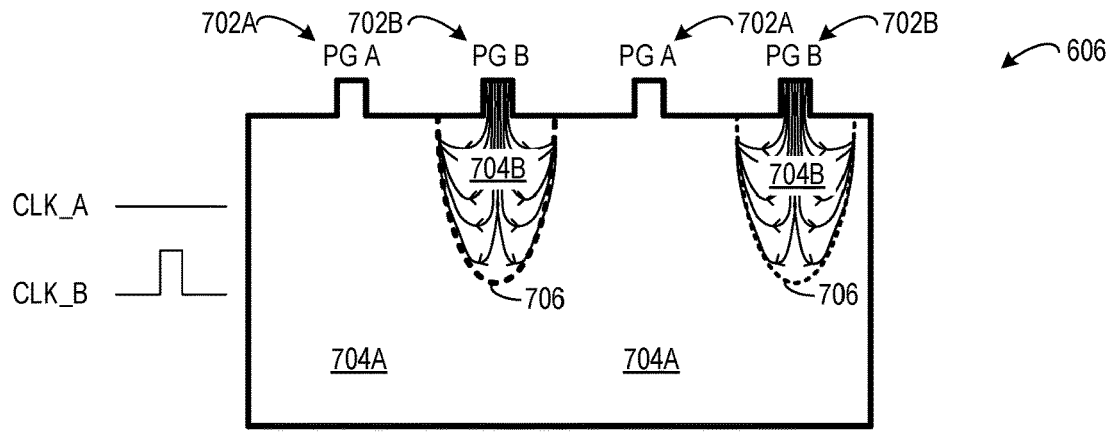

In some implementations, the sensors 606 of sensor array 604 may be differential sensors. FIGS. 7A, 7B, and 7C are cross-sectional views showing aspects of an example differential sensor 606 of sensor array 604 that optionally may be implemented in the camera 600 shown in FIG. 6. The differential sensor 606 may include first and second polysilicon gates (PG A, PG B) 702A, 702B. The polysilicon gates 702A may be energized according to clock signal Clk_A and polysilicon gates 702B may be energized according to clock signal Clk_B. The two clock signals may be controlled differently to control the sensor array to measure different types of illumination. For example, to measured active modulated illumination the two clock signals may be substantially complementary (e.g., Clk_A and Clk_B have 50% duty cycles that are 180 degrees out of phase). In other examples, the two clock signals may have a different relationship, such as for measuring ambient illumination or non-modulated active illumination.

When activated based on the clock signals, the polysilicon gates 702A, 702B create electric fields that respectively attract and collect photoelectric charges to different respective regions 704A, 704B of the differential sensor 606 corresponding to the different polysilicon gates based on the arrival time under the polysilicon gate oxide in the region 704A, 704B. In particular, collected photoelectric charges remain under the gate where the photoelectric charges are initially collected and ultimately diffuse slowly by self-repulsion under each polysilicon gate to a collection node. A p-type doped area 706 or shallow trench isolation (STI) between the different regions creates a potential barrier that ensures charges collected by one polysilicon gate do not transfer to an adjacent polysilicon gate even if one is at a higher potential.

In FIG. 7A, both of the clock signals Clk_A and Clk_B are biased to a low voltage such that the polysilicon gates 702A, 702B collect little or no photoelectric charge in the regions 704A, 704B. In FIG. 7B, clock signal Clk_A is biased to a high voltage and Clk_B is biased to a low voltage. When the Clk_A goes high, the polysilicon gates 702A become energized and photoelectric charge is collected in region 704A as indicated by the electric field lines. The electric field lines run tangent to the boundary of region 704A, so charge does not transfer from region 704A to region 704B. Also, since Clk_B is biased low, the polysilicon gates 702B are not energized, and thus minimal photoelectric charge is collected in region 704B. In FIG. 7C, clock signal Clk_B is biased to a high voltage and Clk_A is biased to a low voltage. When the Clk_B goes high, the polysilicon gates 702B become energized and photoelectric charge is collected in region 704B as indicated by the electric field lines. The electric field lines run tangent to the boundary of region 704B, so charge does not transfer from region 704B to region 704A. Also, since Clk_A is biased low, the polysilicon gates 702A are not energized, and thus minimal photoelectric charge is collected in region 704A.

The differential sensor 606 is configured to collect and assign photoelectric charge in synchronicity with modulation of clock signals Clk_A and Clk_B. The photoelectric charge assignment (classification to PG A or B) in the differential sensor 606 occurs simultaneously with charge collection under the polysilicon gates 702A, 702B, and therefore does not require the additional step of shifting charges from one gate to another gate. In one example, the differential spectral measurement can be performed by synchronously activating a designated spectral illuminator within the 50% time period when the polysilicon gates 702A are energized to collect photoelectric charge from the active illumination in the region 704A. Additionally, the ambient light measurement can be performed by energizing the polysilicon gates 702B while the designated spectral illuminator is deactivated to collect photoelectric charge from the ambient light in the region 704B. The photoelectric charge collected by the region 704B (i.e., the amount of ambient light) is subtracted from the photoelectric charge collected by the region 704A (i.e., the amount of active light and ambient light) to perform a differential measurement in which the ambient light bias is significantly reduced or removed from the measurement of the active illumination. Note this example applies to a scenario where modulated active illumination and ambient illumination are differentially measured.

Such operation allows for the same sensor array to be used to efficiently measure active light across a broad spectrum including ultraviolet, visible, NIR, and IR light. Further, the differential sensors may reduce system noise because only one read operation is required to perform a differential measurement of active spectral light and ambient light. In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory. The depicted differential sensor is provided as an example and other differential sensor configurations may be used in other examples.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

The term 'address' as applied to sensors 606 of sensor array 604 may have a somewhat different meaning depending on the imaging mode described. For broad-band or wide-band imaging—for spectral light including both visible and IR light—addressing the sensors 606 may include integrating the intensity of active light in the sub-band emitted from the designated spectral (or IR) illuminator and received at each sensor 606 and associating the integrated intensity of the active light in the sub-band with the portion of the image corresponding to that sensor.

For depth imaging, the sensors 606 may be addressed differently. Here, addressing the sensors may include resolving a phase offset from each sensor relative to the modulated intensity of the IR light. The phase offset, optionally converted into the depth domain, may be associated with the portion of the image corresponding to the sensor addressed. In other words, the depth controller machine 628 may be configured to determine a depth value for each sensor 606 of the sensor array 604. In some implementations, a series of IR image acquisitions (e.g., 6-9) in rapid succession may be used to obtain the phase offset. In combination depth- and flat-imaging applications, both of the above addressing modes may be used in a time multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions $(X_i, Y_i)$ of an imaged scene, with a depth value $(Z_i)$ indicating, for each pixel, the depth of the corresponding region. 'Depth' is defined as a coordinate parallel to the optical axis of the camera, which increases with increasing distance from the camera. The term 'depth video' refers herein to a time-resolved sequence of depth maps. In ToF implementations, the IR illumination source may project pulsed or otherwise modulated IR illumination towards the scene. The sensor array of the depth-imaging camera may be configured to detect the phase offset between the illumination reflected back from the scene and the modulated emission. In some implementations, the phase offset of each sensor may be converted into a pixel-resolved time of flight of the pulsed illumination, from the illumination source to the scene and then back to the array. ToF data may then be converted into depth data.

The term 'spectral light image' refers to a matrix of pixels registered to corresponding regions $(X_i, Y_i)$ of an imaged scene, with a spectral value (SV) indicating, for each pixel, the spectral signature of the corresponding region in the particular spectral light sub-band. For acquiring the spectral light images in each of the sub-bands (e.g., for a multi-spectral light image), the spectral controller machine 130 is configured to determine a spectral value for each of the differential sensors based on the depth value and a differential measurement of active spectral light and ambient light for the differential sensor.

The depth and multi-spectral data acquired by the camera 600 may be used to fit a neighborhood of pixels to a regular surface (e.g., Lambertian plane, quadric surface), and solve the backscattering (albedo) coefficient for each of the sub-bands in order to calculate a spectral signature of the surface that is ambient light-invariant and can be robustly classified. In such calculations, the depth data may be used to account for a reduction in light intensity due to optical transmission of the light from the light source (IR illuminator 614 or spectral illuminators 618) to the scene 602. In some implementations, the spectral controller machine 630 may be configured to calculate a surface normal for each pixel of the plurality of pixels of the sensor array based on the depth data. A set of surface normals for the plurality of pixels may represent a surface of an imaged scene or subject modeled by an analytic function (e.g., plane or quadric). In some implementations, the spectral controller machine 630 may be configured to calculate a curvature for each pixel of the plurality of pixels of the sensor array based on the depth data. A set of curvatures for the plurality of pixels may represent a surface of an imaged scene or subject modeled by an analytic function (e.g., plane or quadric). The spectral controller machine 630 may be configured to normalize the spectral light measurements in the different spectral light sub-bands based on one or more of the measured depth and the surface normal. This provides a position—and ambient light-invariant spectral signature of an imaged scene or subject.

Output machine 632 is configured to output a matrix of pixels 640. Each pixel in the matrix includes the depth value $(Z_i)$ and the spectral value (e.g., $SV1_i$, $SV2_i$, ... $SV6_i$) for each of the spectral light sub-bands of the plurality of spectral illuminators 618 of the camera 600. In some implementations, the output machine 632 may be further configured to, for each pixel, output a surface normal and/or a curvature. The output machine 632 may be configured to output the matrix of pixels 640 in any suitable form. In some examples, the output machine 632 may output the matrix of pixels 640 as a data structure in which each element of the matrix corresponds to a different pixel, and each element of the matrix includes an array of values corresponding to the spectral values for that pixel and optionally the depth value and optionally a surface normal. Note that a spectral value for the IR light sub-band may be determined for each differential sensor in the process of determining the depth value, and thus each pixel in the matrix may include a spectral value for the IR light sub-band.

In some examples, the output machine 632 may be configured to output different values for the matrix of pixels under different conditions. For example, when the camera 600 is operating in a low-power mode, then the output machine 632 may output greyscale or color (e.g., RGB) values corresponding to ambient light images. On the other hand, when the camera is operating in a high-power mode, the output machine 632 may output depth values corresponding to depth images and spectral values corresponding to spectral light images.

Further, note that the output machine 632 may be configured output the matrix of pixels 640 (and/or any other suitable parameter value) to any suitable recipient internal or external to the camera 600. In one example, the output machine 632 may be configured to output the matrix of pixels 640 to another processing component for additional image processing (e.g., filtering, computer vision). In some examples, the processing component may be incorporated into the camera 600. In some examples, the processing component may be incorporated into a remote computing device in communication with the camera 600. In another example, the output machine 632 may be configured to output the matrix of pixels 640 to an external display device for visual presentation as an image.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
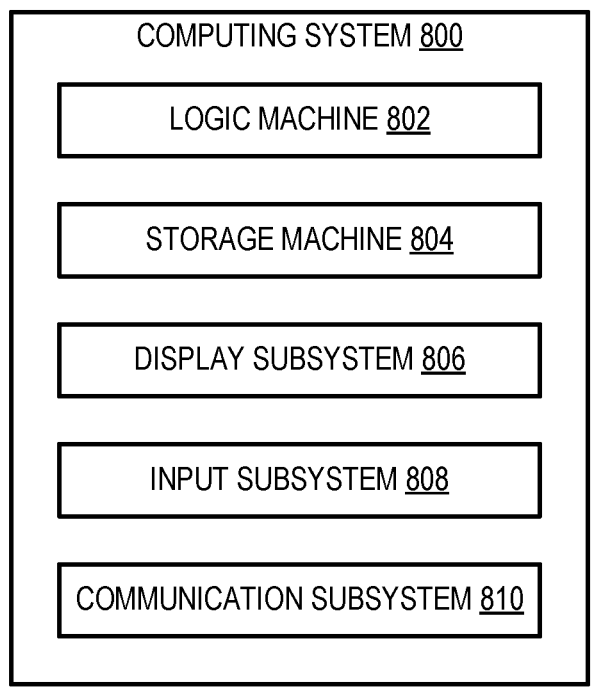
FIG. 8 shows an example computing system.

FIG. 8 schematically shows a non-limiting implementation of a computing system 800 that can enact one or more of the methods and processes described above. Computing system 800 is shown in simplified form. For example, computing system 800 may take the form of camera 102, monitor computing system 120, or retail computing system 130 of FIG. 1.

Computing system 800 includes a logic machine 802 and a storage machine 804. Computing system 800 may optionally include a display subsystem 806, input subsystem 808, communication subsystem 810, and/or other components not shown in FIG. 800.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 804 may include semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of display images translating matrix of pixels 132 into a visual format perceivable by a human. As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem 810 may be configured for communication via a wireless telephone network, or a wired or wireless local- or wide-area network. In some embodiments, the communication subsystem 810 may allow computing system 800 to send and/or receive messages to and/or from other devices via a network such as the Internet.

In an example, a camera system configured to automatically monitor an area comprises a sensor array including a plurality of sensors, an infrared (IR) illuminator configured to emit active IR light in an IR light sub-band, a plurality of spectral illuminators, each spectral illuminator configured to emit active spectral light in a different spectral light sub-band, one or more logic machines, and one or more storage machines holding instructions executable by the one or more logic machines to address the plurality of sensors of the sensor array without active illumination from the IR illuminator and without active illumination from the plurality of spectral illuminators to acquire one or more images of the area, computer analyze the one or more images to identify an above-threshold motion, in response to identifying the above-threshold motion activate the IR illuminator to illuminate at least a first portion of the area with the active IR light, and address the plurality of sensors of the sensor array to acquire one or more depth images of the first portion of the area based on active IR light reflected from the first portion of the area, computer analyze the one or more depth images to identify a human subject, in response to identifying the human subject, for each spectral illuminator of the plurality of spectral illuminators, activate the spectral illuminator to illuminate a second portion of the area with the active spectral light in a spectral light sub-band of the spectral illuminator, address the plurality of sensors of the sensor array to acquire one or more spectral light images of the second portion of the area based on active spectral light in the spectral light sub-band of the spectral illuminator reflected from the second portion of the area, computer analyze at least the one or more spectral light images to identify an interaction between the human subject and an object in the area, and in response to identifying the interaction between the human subject and the object, computer issue an action to be performed for the object in the area. In this example and/or other examples, the one or more storage machines may hold instructions executable by the one or more logic machines to computer recognize that the human subject is a shopper, and the action may include a retail action of computer associating the object in the area with the shopper. In this example and/or other examples, the action may include a retail action of sending to a retail computer a notification to restock the object in the area. In this example and/or other examples, the interaction may include the human subject picking up the object and then replacing the object in the area, and the action may include a retail action of sending to a retail computer a notification to inspect the object. In this example and/or other examples, the one or more storage machines may hold instructions executable by the one or more logic machines to computer analyze the one or more depth images and/or the one or more spectral light images to determine a volume of the object, and the action may include a retail action of associating a cost with the object based on a weight of the object that is derived from the determined volume of the object. In this example and/or other examples, the camera system may further comprise a peripheral pressure sensor configured to generate a pressure signal that indicates whether or not the object is positioned on the peripheral pressure sensor, and the interaction between the human subject and the object may be further identified based on the pressure signal. In this example and/or other examples, the action may include a retail action of associating a cost with the object based on a weight of the object that is derived from the pressure signal. In this example and/or other examples, the one or more storage machines may hold instructions executable by the one or more logic machines to measure a spectral signature of the object based on the one or more spectral light images and the one or more depth images; and computer identify the object based on the measured spectral signature. In this example and/or other examples, the sensor array, the IR illuminator, and the plurality of spectral illuminators may be positioned above the area. In this example and/or other examples, the sensor array, the IR illuminator, and the plurality of spectral illuminators may be incorporated into a head-mounted device wearable by the human subject. In this example and/or other examples, the sensor array, the IR illuminator, and the plurality of spectral illuminators may be incorporated into a shopping cart or basket.

In an example, a method for automatically monitoring an area comprises addressing a plurality of sensors of a sensor array of a camera without active illumination from an IR illuminator of the camera and without active spectral illumination from a plurality of spectral illuminators of the camera to acquire one or more images of the area, computer analyzing the one or more images to identify an above-threshold motion, in response to identifying the above-threshold motion, activating the IR illuminator to illuminate at least a first portion of the retail shopping area with the active IR light, and addressing the plurality of sensors of the sensor array to acquire one or more depth images of the first portion of the area based on active IR light reflected from the first portion of the area, computer analyzing the one or more depth images to identify a human subject, in response to identifying the human subject, for each spectral illuminator of the plurality of spectral illuminators activating the spectral illuminator to illuminate a second portion of the area with the active spectral light in a spectral light sub-band of the spectral illuminator, addressing the plurality of sensors of the sensor array to acquire one or more spectral light images of the second portion of the area based on active spectral light in the spectral light sub-band of the spectral illuminator reflected from the second portion of the area, computer analyzing at least the one or more spectral light images to identify an interaction between the human subject and an object in the area, and in response to identifying the interaction between the human subject and the object, computer issuing an action to be performed for the object in the area. In this example and/or other examples, the method may further comprise computer recognizing that the human subject is a shopper, and the action may include a retail action of computer associating the object in the area with the shopper. In this example and/or other examples, the action may include a retail action of sending to a retail computer a notification to restock the object for purchase. In this example and/or other examples, the interaction may include the human subject picking up the object and then replacing the object in the area, and the action may include a retail action of sending to a retail computer a notification to inspect the object. In this example and/or other examples, the method may further comprise computer analyzing the one or more depth images and/or the one or more spectral light images to determine a volume of the object, and the action may include a retail action of associating a cost with the object based on a weight of the object that is derived from the determined volume of the object. In this example and/or other examples, the method may further comprise generating, via a peripheral pressure sensor, a pressure signal that indicates whether or not the object is positioned on the peripheral pressure sensor; and the interaction between the human subject and the object may be further identified based on the pressure signal. In this example and/or other examples, the action may include a retail action of associating a cost with the object based on a weight of the object that is derived from the pressure signal. In this example and/or other examples, the method may further comprise measuring a spectral signature of the object based on the one or more spectral light images and the one or more depth images, and computer identifying the object based on the measured spectral signature.

In an example, a multi-camera system configured to automatically monitor a retail shopping area comprises a plurality of cameras positioned above the retail shopping area, each camera positioned to have a different field of view of the retail shopping area, each camera of the plurality of cameras comprising, a sensor array including a plurality of sensors, an infrared (IR) illuminator configured to emit active IR light in an IR light sub-band, a plurality of spectral illuminators, each spectral illuminator configured to emit active spectral light in a different spectral light sub-band, one or more logic machines, and one or more storage machines holding instructions executable by the one or more logic machines to acquire a plurality of depth images of the retail shopping area via the plurality of cameras, each depth image based on active IR light reflected from the retail shopping area, computer analyze the plurality of depth images to identify a human subject, acquire a plurality of spectral light images of the retail shopping area via the plurality of cameras, each spectral light image based on active spectral light in a spectral light sub-band of a spectral illuminator of the camera reflected from the retail shopping area, computer analyze at least the plurality of spectral light images to identify an interaction between the human subject and an object for purchase, and in response to identifying the interaction between the human subject and the object for purchase, computer issue a retail action to be performed for the object for purchase.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera system configured to automatically monitor an area, the camera system comprising:
    a sensor array including a plurality of sensors;
    an infrared (IR) illuminator configured to emit active IR light in an IR light sub-band;
    a plurality of spectral illuminators, each spectral illuminator configured to emit active spectral light in a different spectral light sub-band;
    one or more logic machines; and
    one or more storage machines holding instructions executable by the one or more logic machines to:
        address the plurality of sensors of the sensor array without active illumination from the IR illuminator and without active illumination from the plurality of spectral illuminators to acquire one or more images of the area;
        computer analyze the one or more images to identify an above-threshold motion;
        in response to identifying the above-threshold motion:
            activate the IR illuminator to illuminate at least a first portion of the area with the active IR light, and
            address the plurality of sensors of the sensor array to acquire one or more depth images of the first portion of the area based on active IR light reflected from the first portion of the area,
        computer analyze the one or more depth images to identify a human subject;
        in response to identifying the human subject, for each spectral illuminator of the plurality of spectral illuminators:
            activate the spectral illuminator to illuminate a second portion of the area with the active spectral light in only a spectral light sub-band of the spectral illuminator,
            address the plurality of sensors of the sensor array to acquire one or more spectral light images of the second portion of the area based on active spectral light in the spectral light sub-band of the spectral illuminator reflected from the second portion of the area and without filtering light in other spectral sub-bands reflected from the second portion of the area to the plurality of sensors of the sensor array,
            computer analyze at least the one or more spectral light images to identify an interaction between the human subject and an object in the area, and
        in response to identifying the interaction between the human subject and the object, computer issue an action to be performed for the object in the area.

2. The camera system of claim 1, wherein the one or more storage machines hold instructions executable by the one or more logic machines to: computer recognize that the human subject is a shopper, and wherein the action includes a retail action of computer associating the object in the area with the shopper.

3. The camera system of claim 1, wherein the action includes a retail action of sending to a retail computer a notification to restock the object in the area.

4. The camera system of claim 1, wherein the interaction includes the human subject picking up the object and then replacing the object in the area, and wherein the action includes a retail action of sending to a retail computer a notification to inspect the object.

5. The camera system of claim 1, wherein the one or more storage machines hold instructions executable by the one or more logic machines to: computer analyze the one or more depth images and/or the one or more spectral light images to determine a volume of the object, and wherein the action includes a retail action of associating a cost with the object based on a weight of the object that is derived from the determined volume of the object.

6. The camera system of claim 1, further comprising:
    a peripheral pressure sensor configured to generate a pressure signal that indicates whether or not the object is positioned on the peripheral pressure sensor; and
    wherein the interaction between the human subject and the object is further identified based on the pressure signal.

7. The camera system of claim 6, wherein the action includes a retail action of associating a cost with the object based on a weight of the object that is derived from the pressure signal.

8. The camera system of claim 1, wherein the one or more storage machines hold instructions executable by the one or more logic machines to: measure a spectral signature of the object based on the one or more spectral light images and the one or more depth images; and computer identify the object based on the measured spectral signature.

9. The camera system of claim 1, wherein the sensor array, the IR illuminator, and the plurality of spectral illuminators are positioned above the area.

10. The camera system of claim 1, wherein the sensor array, the IR illuminator, and the plurality of spectral illuminators are incorporated into a head-mounted device wearable by the human subject.

11. The camera system of claim 1, wherein the sensor array, the IR illuminator, and the plurality of spectral illuminators are incorporated into a shopping cart or basket.

12. A method for automatically monitoring an area, the method comprising:
addressing a plurality of sensors of a sensor array of a camera without active illumination from an IR illuminator of the camera and without active spectral illumination from a plurality of spectral illuminators of the camera to acquire one or more images of the area;
computer analyzing the one or more images to identify an above-threshold motion;
in response to identifying the above-threshold motion:
activating the IR illuminator to illuminate at least a first portion of the retail shopping area with the active IR light, and
addressing the plurality of sensors of the sensor array to acquire one or more depth images of the first portion of the area based on active IR light reflected from the first portion of the area,
computer analyzing the one or more depth images to identify a human subject;
in response to identifying the human subject, for each spectral illuminator of the plurality of spectral illuminators:
activating the spectral illuminator to illuminate a second portion of the area with the active spectral light only in a spectral light sub-band of the spectral illuminator,
addressing the plurality of sensors of the sensor array to acquire one or more spectral light images of the second portion of the area based on active spectral light in the spectral light sub-band of the spectral illuminator reflected from the second portion of the area and without filtering light in other spectral sub-bands reflected from the second portion of the area to the plurality of sensors of the sensor array,
computer analyzing at least the one or more spectral light images to identify an interaction between the human subject and an object in the area, and
in response to identifying the interaction between the human subject and the object, computer issuing an action to be performed for the object in the area.

13. The method of claim 12, further comprising:
computer recognizing that the human subject is a shopper, and wherein the action includes a retail action of computer associating the object in the area with the shopper.

14. The method of claim 12, wherein the action includes a retail action of sending to a retail computer a notification to restock the object for purchase.

15. The method of claim 12, wherein the interaction includes the human subject picking up the object and then replacing the object in the area, and wherein the action includes a retail action of sending to a retail computer a notification to inspect the object.

16. The method of claim 12, further comprising:
computer analyzing the one or more depth images and/or the one or more spectral light images to determine a volume of the object, and wherein the action includes a retail action of associating a cost with the object based on a weight of the object that is derived from the determined volume of the object.

17. The method of claim 12, further comprising: generating, via a peripheral pressure sensor, a pressure signal that indicates whether or not the object is positioned on the peripheral pressure sensor; and wherein the interaction between the human subject and the object is further identified based on the pressure signal.

18. The method of claim 17, wherein the action includes a retail action of associating a cost with the object based on a weight of the object that is derived from the pressure signal.

19. The method of claim 12, further comprising:
measuring a spectral signature of the object based on the one or more spectral light images and the one or more depth images; and
computer identifying the object based on the measured spectral signature.

20. A camera system configured to automatically monitor a retail shopping area, the camera system comprising:
a sensor array including a plurality of sensors;
an infrared (IR) illuminator configured to emit active IR light in an IR light sub-band;
a plurality of spectral illuminators, each spectral illuminator configured to emit active spectral light in a different spectral light sub-band;
one or more logic machines; and
one or more storage machines holding instructions executable by the one or more logic machines to:
address the plurality of sensors of the sensor array without active illumination from the IR illuminator and without active illumination from the plurality of spectral illuminators to acquire one or more images of the retail shopping area;
computer analyze the one or more images to identify an above-threshold motion;
in response to identifying the above-threshold motion:
activate the IR illuminator to illuminate at least a first portion of the retail shopping area with the active IR light, and
address the plurality of sensors of the sensor array to acquire one or more depth images of the first portion of the retail shopping area based on active IR light reflected from the first portion of the retail shopping area,
computer analyze the one or more depth images to identify a human subject;
in response to identifying the human subject, for each spectral illuminator of the plurality of spectral illuminators:
activate the spectral illuminator to illuminate a second portion of the retail shopping area with the active spectral light in only a spectral light sub-band of the spectral illuminator,
address the plurality of sensors of the sensor array to acquire one or more spectral light images of the second portion of the retail shopping area based on active spectral light in the spectral light sub-band of the spectral illuminator reflected from the second portion of the retail shopping area and without filtering light in other spectral sub-bands reflected from the second portion of the retail shopping area to the plurality of sensors of the sensor array, computer analyze at least the one or more spectral light images to identify an interaction between the human subject and an object in the retail shopping area, computer recognize that the human subject is a shopper based on the interaction between the human subject and the object; and computer associating the object in the retail shopping area with the shopper.

* * * * *